US012621871B2

(12) United States Patent
Golitschek Edler von Elbwart et al.

(10) Patent No.: US 12,621,871 B2
(45) Date of Patent: May 5, 2026

(54) EFFICIENT RACH BEHAVIOR

(71) Applicant: Lenovo (Singapore) Pte. Ltd., New Tech Park (SG)

(72) Inventors: Alexander Johann Maria Golitschek Edler von Elbwart, Darmstadt (DE); Prateek Basu Mallick, Dreieich (DE); Joachim Loehr, Wiesbaden (DE); Hyejung Jung, Northbrook, IL (US); Vijay Nangia, Woodridge, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/468,522

(22) Filed: Sep. 15, 2023

(65) Prior Publication Data

US 2024/0080888 A1 Mar. 7, 2024

Related U.S. Application Data

(63) Continuation of application No. 16/456,477, filed on Jun. 28, 2019, now Pat. No. 11,805,547.

(Continued)

(51) Int. Cl.
H04W 74/0833 (2024.01)
H04L 1/00 (2006.01)
(Continued)

(52) U.S. Cl.
CPC ....... H04W 74/0833 (2013.01); H04L 1/0063 (2013.01); H04L 1/1819 (2013.01);
(Continued)

(58) Field of Classification Search
None
See application file for complete search history.

(56) References Cited

U.S. PATENT DOCUMENTS

2010/0142470 A1 6/2010 Park et al.
2011/0261763 A1 10/2011 Chun et al.
(Continued)

OTHER PUBLICATIONS

3GPP, "3rd Generation Partnership Project; Technical Specification Group Radio Access Network; NR; Multiplexing and channel coding (Release 15)", 3GPP TS 38.212 V15.1.1, Apr. 2018, pp. 1-94.

(Continued)

*Primary Examiner* — Adnan Baig
(74) *Attorney, Agent, or Firm* — Kunzler Needham & Hilton

(57) ABSTRACT

Apparatuses, methods, and systems are disclosed for efficient RACH behavior. One method performed by a UE includes transmitting a first PRACH preamble to a base unit to start a RACH procedure and receiving a RAR (Msg2) from the base unit during a random access response window. The method includes transmitting a second PRACH preamble in response to being unable to transmit a RACH Msg3 within an indicated transmission opportunity. The UE may obtain multiple transmission opportunities for transmitting a RACH message such as RACH Msg1 or RACH Msg3 or monitor for multiple RACH Msg2 where transmission opportunity data are conveyed via a RACH Order, an RAR, or DCI for the RACH message. An apparatus or system may perform steps of the method.

20 Claims, 8 Drawing Sheets

Related U.S. Application Data

(60) Provisional application No. 62/692,542, filed on Jun. 29, 2018.

(51) Int. Cl.

| | |
|---|---|
| *H04L 1/1812* | (2023.01) |
| *H04W 24/08* | (2009.01) |
| *H04W 72/0446* | (2023.01) |
| *H04W 72/23* | (2023.01) |
| *H04W 74/0808* | (2024.01) |
| *H04W 76/11* | (2018.01) |
| *H04W 80/02* | (2009.01) |
| *H04W 74/0836* | (2024.01) |
| *H04W 74/0838* | (2024.01) |

(52) U.S. Cl.
CPC ....... *H04W 24/08* (2013.01); *H04W 72/0446* (2013.01); *H04W 72/23* (2023.01); *H04W 74/0808* (2013.01); *H04W 76/11* (2018.02); *H04W 80/02* (2013.01); *H04W 74/0836* (2024.01); *H04W 74/0838* (2024.01)

(56) References Cited

U.S. PATENT DOCUMENTS

| | | | | |
|---|---|---|---|---|
| 2013/0010623 A1* | 1/2013 | Golitschek | ........... | H04W 24/10 370/252 |
| 2015/0181595 A1* | 6/2015 | Li | ..................... | H04W 72/0446 370/336 |
| 2016/0219624 A1* | 7/2016 | Lin | ..................... | H04W 74/085 |
| 2016/0227575 A1* | 8/2016 | Furuskog | .......... | H04W 74/0833 |
| 2017/0273113 A1* | 9/2017 | Tirronen | .............. | H04W 72/23 |
| 2018/0176961 A1* | 6/2018 | Babaei | ............. | H04W 74/0833 |
| 2018/0242321 A1* | 8/2018 | Takeda | .................. | H04L 5/0051 |
| 2018/0331801 A1* | 11/2018 | Islam | .................... | H04L 5/0094 |
| 2019/0281636 A1* | 9/2019 | Liu | ....................... | H04W 16/14 |

| | | | | |
|---|---|---|---|---|
| 2020/0045735 A1* | 2/2020 | Kim | ...................... | H04W 52/36 |
| 2020/0059968 A1* | 2/2020 | Christoffersson | ..... | H04W 72/23 |
| 2020/0092044 A1* | 3/2020 | Park | ........................ | H04L 1/189 |
| 2020/0113011 A1* | 4/2020 | Peisa | ..................... | H04W 48/12 |
| 2020/0196354 A1* | 6/2020 | Li | ..................... | H04W 74/0833 |
| 2021/0195631 A1* | 6/2021 | Christoffersson | ........................... H04W 74/0833 |

OTHER PUBLICATIONS

3GPP, 3rd Generation Partnership Project; Technical Specification Group Radio Access Network; NR; Physical layer procedures for control (Release 15), 3GPP TS 38.213 V15.1.0, Mar. 2018, pp. 1-77.

3GPP, "3rd Generation Partnership Project; Technical Specification Group Radio Access Network; NR; Physical layer procedures for data (Release 15)", 3GPP TS 38.214 V15.1.0, Mar. 2018, pp. 1-77.

3GPP, "3rd Generation Partnership Project; Technical Specification Group Radio Access Network; NR; Medium Access Control (MAC) protocol specification (Release 15)", 3GPP TS 38.321 V15.2.0, Jun. 2018, pp. 1-73.

ZTE, "Considerations on channel access procedure for NR-U", 3GPP TSG RAN WG2 NR AH1807 Meeting R2-1809841, Jul. 2-6, 2018, pp. 1-3.

Interdigital Inc. "Considerations on Random Access for NR Unlicensed Spectrum", 3GPP TSG RAN WG1 Meeting 92 R1-1802648, Feb. 26-Mar. 2, 2018, pp. 1-4.

Hwawei, Hisilicon, "Initial access in NR unlicensed", 3GPP TSG RAN WG1 Meeting #93 R1-1805920, May 21-May 25, 2018, pp. 1-6.

Vivo, "RACH enhancement in NR-U", 3GPP TSG-RAN WG2 NR AH1807 Meeting R2-1809863, Jul. 2-6, 2018, pp. 1-3.

Intel Corporation, "Random access procedure for NR-u", 3GPP TSG-RAN WG2 NR AdHoc #1807 R2-1809788, Jul. 2-6, 2018, pp. 1-4.

* cited by examiner

EFFICIENT RACH BEHAVIOR

FIELD

The subject matter disclosed herein relates generally to wireless communications and more particularly relates to an efficient RACH behavior, such as for NR-U.

BACKGROUND

The following abbreviations are herewith defined, at least some of which are referred to within the following description: Third Generation Partnership Project ("3GPP"), Fifth Generation Core Network ("5CG"), Fifth Generation System ("5GS"), Access and Mobility Management Function ("AMF"), Positive-Acknowledgment ("ACK"), Access Stratum ("AS"), Automatic Repeat Request ("ARQ"), Autonomous UpLink ("AUL"), Backoff Indicator ("BI"), Base Station ("BS"), Binary Phase Shift Keying ("BPSK"), Bandwidth Part ("BWP"), Cell Radio Network Temporary Identifier ("C-RNTI"), Clear Channel Assessment ("CCA"), Cyclic Prefix ("CP"), Cyclical Redundancy Check ("CRC"), Channel State Information ("CSI"), Common Search Space ("CSS"), Connection Mode ("CM", this is a NAS state in 5GS), Contention Based Random Access ("CBRA"), Contention Free Random Access ("CFRA"), Control Plane ("CP"), Core Network ("CN"), Data Radio Bearer ("DRB"), Discrete Fourier Transform Spread ("DFTS"), Downlink Control Information ("DCI"), Downlink ("DL"), Downlink Pilot Time Slot ("DwPTS"), Discontinuous Transmission ("DTX"), Dual Connectivity ("DC"), Dual Registration mode ("DR mode"), Enhanced Clear Channel Assessment ("eCCA"), Enhanced Licensed Assisted Access ("eLAA"), Enhanced Mobile Broadband ("eMBB"), Evolved Node-B ("eNB"), Evolved Packet Core ("EPC"), Evolved Packet System ("EPS"), EPS Mobility Management ("EMM") (this is a NAS state in EPS), Evolved UMTS Terrestrial Radio Access ("E-UTRA"), European Telecommunications Standards Institute ("ETSI"), Frame Based Equipment ("FBE"), Frequency Division Duplex ("FDD"), Frequency Division Multiple Access ("FDMA"), Frequency Division Orthogonal Cover Code ("FD-OCC"), Guard Period ("GP"), Globally Unique Temporary UE Identifier ("GUTI"), Hybrid Automatic Repeat Request ("HARQ"), Internet-of-Things ("IoT"), International Mobile Subscriber Identity ("IMSI"), Licensed Assisted Access ("LAA"), Load Based Equipment ("LBE"), Listen-Before-Talk ("LBT"), Long Term Evolution ("LTE"), Multiple Access ("MA"), Medium Access Control ("MAC"), Mobility Management Entity ("MME"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), New Generation Node B ("gNB"), New Generation Radio Access Network ("NG-RAN", a RAN used for 5GS networks), New Radio ("NR"), New Radio in Unlicensed Spectrum ("NR-U"), Non-Access Stratum ("NAS"), Non-Orthogonal Multiple Access ("NOMA"), Normal Uplink ("NUL"), Operation and Maintenance System ("OAM"), Orthogonal Frequency Division Multiplexing ("OFDM"), Packet Data Unit ("PDU")(used in connection with 'PDU Session'), Packet Switched ("PS", e.g., Packet Switched domain or Packet Switched service), Primary Cell ("PCell"), Physical ("PHY"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Public Land Mobile Network ("PLMN"), Quality of Service ("QoS"), Quadrature Phase Shift Keying ("QPSK"), Radio Access Network ("RAN"), Radio Access Technology ("RAT"), Radio Resource Control ("RRC"), Random Access Procedure ("RACH"), Random Access Response ("RAR"), Radio Network Temporary Identifier ("RNTI"), Random Access Radio Network Temporary Identifier ("RA-RNTI"), Reference Signal ("RS"), Registration Area ("RA") (similar to tacking area list used in LTE/EPC), Registration Management ("RA", refers to NAS layer procedures and states), Remaining Minimum System Information ("RMSI"), Resource Spread Multiple Access ("RSMA"), Round Trip Time ("RTT"), Receive ("RX"), Sparse Code Multiple Access ("SCMA"), Scheduling Request ("SR"), Single Carrier ("SC"), Single Carrier Frequency Division Multiple Access ("SC-FDMA"), Secondary Cell ("SCell"), Shared Channel ("SCH"), Session Management Function ("SMF"), Signal-to-Interference-Plus-Noise Ratio ("SINR"), Single Network Slice Selection Assistance Information ("S-NSSAI"), Single Registration mode ("SR mode"), System Frame Number ("SFN"), System Information Block ("SIB"), Synchronization Signal ("SS"), Supplementary Uplink ("SUL"), Tracking Area ("TA"), Technical Specification ("TS"), Transport Block ("TB"), Transport Block Size ("TB S"), Time-Division Duplex ("TDD"), Time Division Multiplex ("TDM"), Time Division Orthogonal Cover Code ("TD-OCC"), Transmission Time Interval ("TTI"), Transmit ("TX"), Unified Data Management ("UDM"), Uplink Control Information ("UCI"), User Entity/Equipment (Mobile Terminal) ("UE"), Uplink ("UL"), User Plane ("UP"), Universal Mobile Telecommunications System ("UMTS"), UMTS Terrestrial Radio Access ("UTRA"), UMTS Terrestrial Radio Access Network ("UTRAN"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

When there is a handover of a UE from a source cell to a target cell in New Radio in Unlicensed Spectrum ("NR-U"), according to the RACH procedure after the preamble transmission (PRACH, Msg1) the UE expects a Random Access Response (RAR, Msg2), which among other information includes the Random Access Response Grant indicating transmission parameters related to the following UE's transmission (Msg3). All these transmissions happen on the unlicensed medium, which may imply a need to follow a Listen-Before-Talk ("LBT") procedure for each of those messages individually and independently. Specifically, the Grant transmitted in Msg2 for Msg3 includes a timing offset, e.g., indicating a specific time slot in which the UE is to transmit Msg3.

The successful reception of Msg3 may fail (from the base unit's perspective) due to the following reasons: 1) The UE was not able to detect Msg2 successfully, caused by noise or interference by (e.g. hidden) nodes; or 2) The UE was not able to access the channel for Msg3 transmission in the indicated time slot due to LBT failure (unsuccessful CCA); or 3) The base unit was not able to detect Msg3 successfully, caused by noise or interference by (e.g. hidden) nodes.

Existing solutions enable the base unit to request a HARQ retransmission of Msg3, i.e., follow the established HARQ procedure for Msg3. While requesting a HARQ retransmission may remedy Reasons 2 and 3 above, requesting a HARQ retransmission does not remedy Reason 1. This is because the UE is not even aware what kind of transport block is requested for retransmission. Following the HARQ procedure implies a delay, caused by the additional round-trip time of transmitting the HARQ retransmission request by the base unit, and the following retransmission by the UE—both of which may suffer additional delay caused by the required LBT procedure for both these transmissions. Refer to 3GPP TS 38.321 v15.2.0.

According to existing solutions, Reason 1 can only be rectified after the random access response window has expired, a preamble transmission counter is incremented, and the whole procedure continues with the UE transmitting Msg1 again. Waiting for the random access response window to expire and then continuing with the UE transmitting Msg1 again also implies a delay for the successful completion of the overall random access procedure.

BRIEF SUMMARY

Apparatuses, methods, and systems are disclosed for performing an efficient RACH procedure. A method is disclosed that includes transmitting a first physical random-access channel ("PRACH") preamble to a base unit to start a RACH procedure; receiving a random access response from the base unit during a random access response window; and transmitting a second PRACH preamble in response to being unable to transmit a RACH Msg3 within an indicated RACH Msg3 transmission opportunity.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
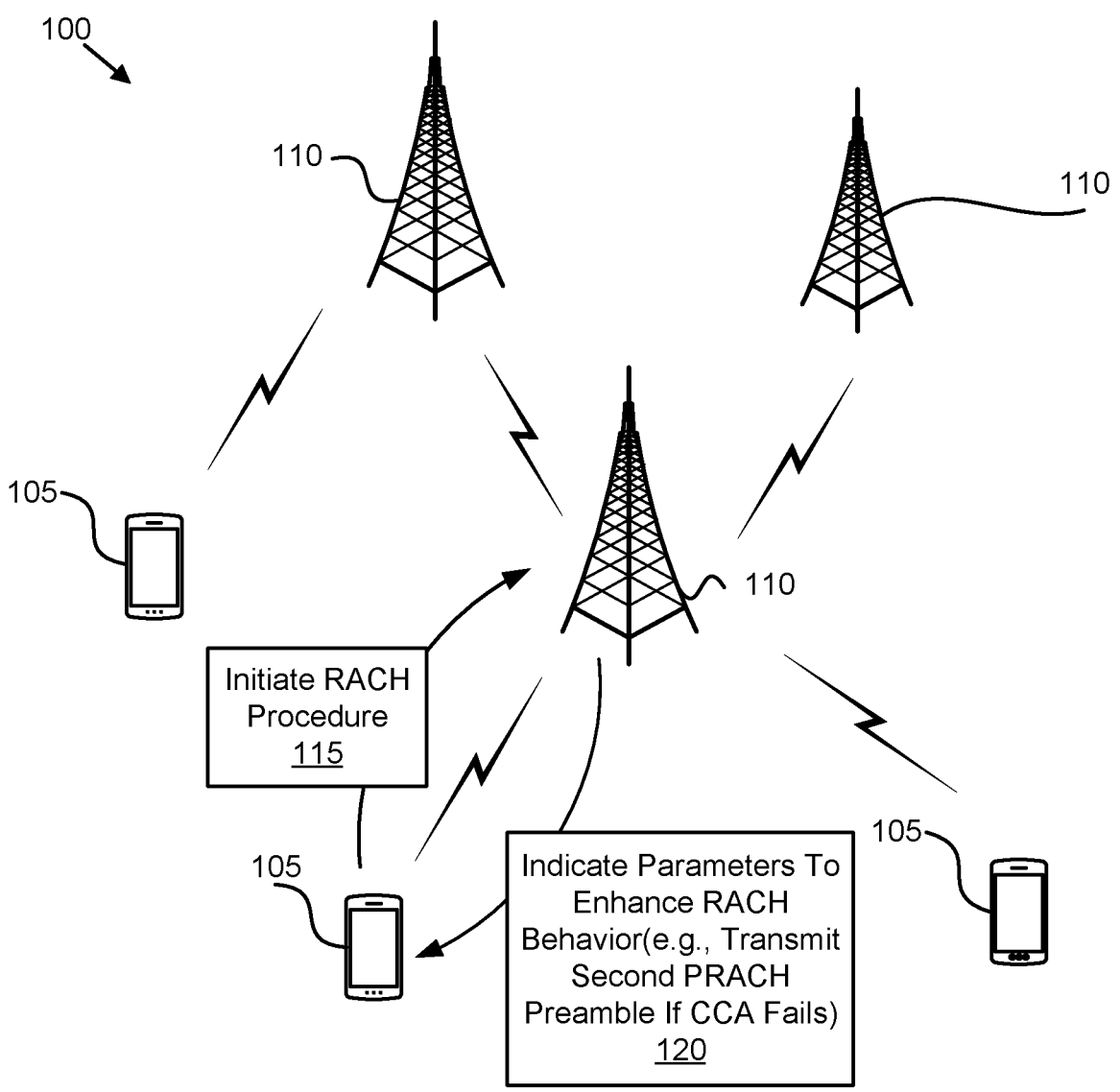
FIG. 1 is a schematic block diagram illustrating one embodiment of a wireless communication system for efficient RACH behavior.

As may be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Generally, the present disclosure describes systems, methods, and apparatus that provide efficient RACH behavior for a scenario where a transmission of at least one RACH message may fail due to radio resource access rule(s), such as for NR-U. In some embodiments, multiple transmission opportunities are supported for RACH Msg1, RACH Msg2, and RACH Msg3 to alleviate the transmission restrictions imposed by LBT and delay caused by Msg3 retransmissions according to the HARQ protocol. In various embodiments, any RACH behavior or portion thereof may be considered efficient if it minimizes one or more delays relative to delays which may occur with an unmodified RACH behavior found in an existing standard such as found in Release 15.

Figure 4:
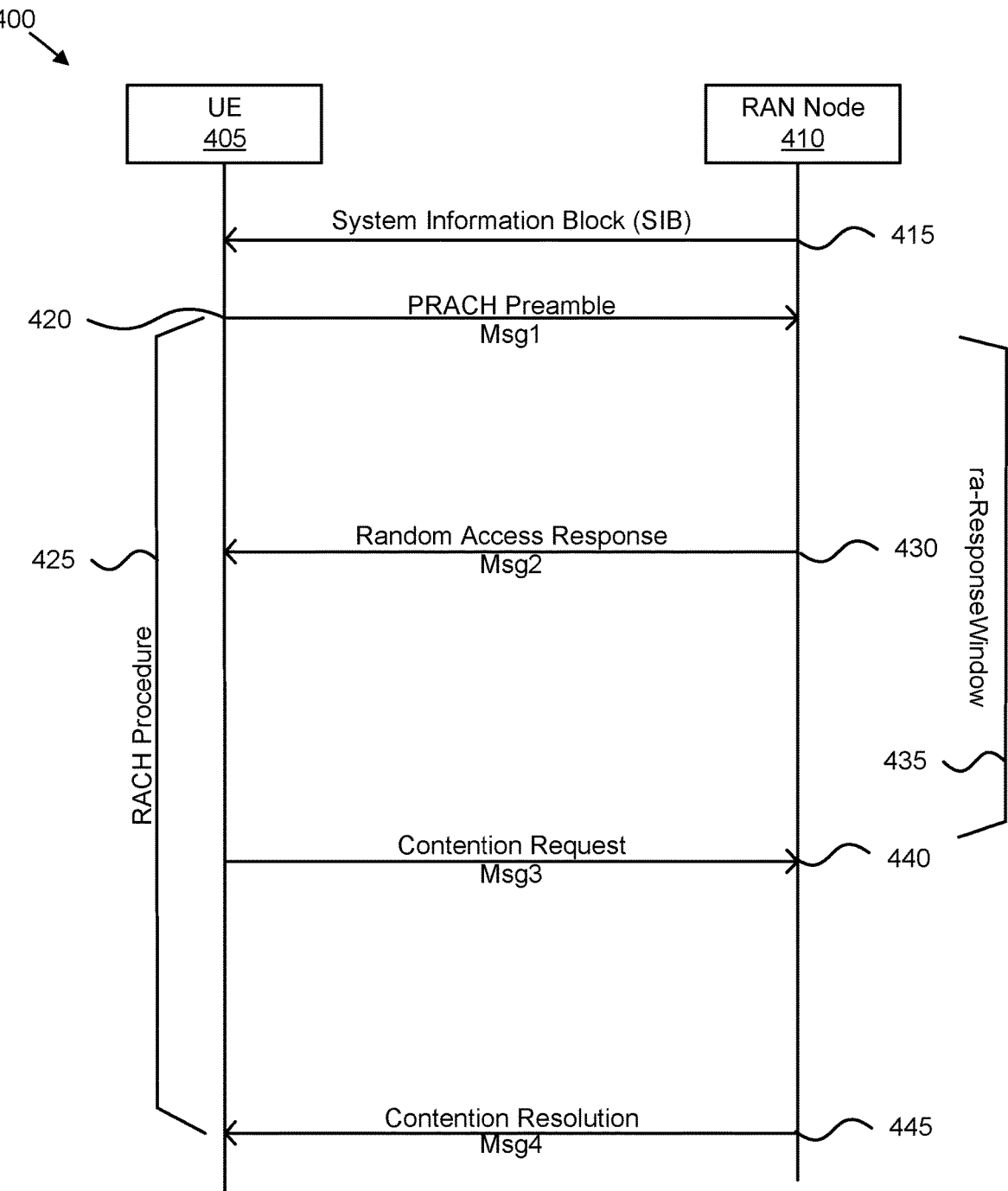
FIG. 4 is a block diagram illustrating one embodiment of a RACH procedure.

It may be noted that the present disclosure uses terminology to describe various messages and procedures as outlined in 3GPP LTE, NR, and/or NR-U specifications available at the time of filing. Specifically, for the Random Access Procedure (sometime called RACH Procedure). FIG. 4 shows frequently used NR and/or NR-U terminology for the four involved message exchanges. Note that in the NR or NR-U context, the terms "gNB", or "RAN node" may be used instead of "base unit."

It may be noted that FIGS. 4-7 depict a so-called "contention-based random access" (CBRA). However, the present disclosure may also be applied to "contention-free random access" (CFRA), for which some details are given later. Likewise, the principles of the solutions and embodiments may be applied to a 2-step RACH procedure, where only two messages are exchanged.

A first embodiment to support an efficient RACH behavior, such as for NR-U (e.g., multiple transmission occasions for RACH Msg2 and RACH Msg3) includes changing the UE behavior to monitor the DL control channel for Msg2 transmissions even after it has successfully received a Random Access Response containing Random Access Preamble identifiers that matches the transmitted PRACH preamble, i.e., even after the Random Access Response (Msg2) reception is considered successful.

Moreover, to avoid conflicting or unclear behavior with respect to the Msg3 transmission, the UE may expect that multiple Msg2 transmissions indicate the same Msg3 transport block parameters, such that the transport block size indicated by two (or more) Msg2 transmissions within the ra-ResponseWindow does not change. This simplifies the UE implementation because the same data payload can be kept in the transmission buffer. This efficient UE behavior allows the base unit to perform multiple Msg2 transmissions to the same UE within the ra-ResponseWindow. Note that from the lack of successful Msg3 reception (e.g., by DTX detection on Msg3 PUSCH resource or associated reference signal corresponding to Msg3), the base unit cannot know whether the UE failed to receive a Msg2 transmission, or whether channel access was not allowed due to a failed LBT.

According to current specification, in the case where the UE has missed Msg2 reception, the UE continues to monitor for PDCCH with CRC scrambled by RA-RNTI until the end of the ra-ResponseWindow until it receives a valid PDCCH with CRC scrambled by RA-RNTI and the Random Access Response containing Random Access Preamble identifier that matches the transmitted PRACH preamble index. Therefore, the base unit cannot be sure whether a HARQ retransmission grant will be interpreted correctly by the UE, as the UE's correct interpretation of the retransmission grant requires a successful reception of Msg2 addressed to the UE. In various embodiments, the UE is instructed to continue monitoring for Random Access Responses (Msg2) for the whole duration of the ra-ResponseWindow.

Note that, according to the existing specification, monitoring for Random Access Responses (Msg2) for the whole duration of the ra-ResponseWindow implies monitoring downlink control information (DCI) where the CRC parity bits are scrambled with the RA-RNTI. With this embodiment, the base unit can send another Msg2 (with the mentioned constraint of the transport block size), where the CRC parity bits of the DCI are scrambled with a Temporary Cell-Radio Network Temporary Identifier (TC-RNTI) or scrambled with a Cell-Radio Network Temporary Identifier (C-RNTI), to schedule another Msg3 opportunity, instead of using a PDCCH carrying DCI triggering a HARQ retransmission of Msg3. In a further enhancement of the first embodiment, the Msg2 may include an additional redundancy version (RV) parameter to facilitate efficient HARQ combination of different Msg3 transmissions.

In certain embodiments, the UE may restart the RACH response window, i.e. ra-ResponseWindow, upon having successfully received a RAR for the corresponding PRACH preamble transmission, i.e. considering the Random Access Response reception successful, thereby dynamically extending the time during which a UE monitors for a PDCCH carrying DCI where the CRC parity bits of the DCI are scrambled with RA-RNTI. Such an approach is suited to the case that the UE has received the RAR successfully, but was unable to transmit the Msg3 e.g., due to a blocked channel at the indicated time.

In the embodiments and enhancements described, the ra-ResponseWindow or the total time during which the UE monitors for Msg2 PDCCH carrying DCI where the CRC parity bits of the DCI are scrambled with RA-RNTI (including any restart of the RACH response window) may need to be increased/extended. This may result in a Msg2 (RAR) window length that is greater than 10 ms (a radio frame or system frame), note that 10 ms is the current maximum value for Msg2 (RAR) window length according to current specification. To uniquely identify the multiple RACH occasions with the larger (>10 ms) Msg2 window, the RA-RNTI computation may need to be updated and/or be based on the SFN (System Frame Number). In certain embodiments, the RA-RNTI may be based on an integer parameter 'x' representing the maximum allowed value of the (extended) Msg2 window (ra-ResponseWindow) (e.g., in multiple of 10 ms) which may be fixed in the specification (e.g., x=ceiling(max Msg2 window length (in ms)/10), where ceiling(num)=the smallest integer equal to or greater than num, so x=2 for 20 ms, e.g., a maximum value of the Msg2 window) or signaled via higher layers such as in the RACH configuration.

In one embodiment, defining the extended Msg2 window may be realized by the defining the RA-RNTI associated with the PRACH in which the Random Access Preamble is transmitted as:

$$\text{RA-RNTI}=1+s\_id+14{\times}t\_id+14{\times}80{\times}f\_id+14{\times}80{\times}8{\times} \\ \text{ul\_carrier\_id}+14{\times}80{\times}8{\times}2{\times}\text{SFN mod } x \qquad \text{Eq. 1}$$

where s_id is the index of the first OFDM symbol of the specified PRACH ($0{\leq}$s_id<14), t_id is the index of the first slot of the specified PRACH in a system frame ($0{\leq}$t_id<80), fid is the index of the specified PRACH in the frequency domain ($0{\leq}$fid<8), SFN is the system frame number of the specified PRACH, 'x' is the maximum allowed value of the ra-ResponseWindow, and ul_carrier_id is the UL carrier used for Msg1 transmission (0 for NUL carrier, and 1 for SUL carrier).

Alternatively, defining the extended Msg2 window may be realized by defining the RA-RNTI associated with the PRACH in which the Random Access Preamble is transmitted as:

$$\text{RA-RNTI}=1+s\_id+14{\times}t\_id+14{\times}80{\times}f\_id+14{\times}80{\times}8{\times} \\ \text{SFN mod } x+14{\times}80{\times}8{\times}x{\times}\text{ul\_carrier\_id} \qquad \text{Eq. 2}$$

where s_id is the index of the first OFDM symbol of the specified PRACH ($0{\leq}$s_id<14), t_id is the index of the first slot of the specified PRACH in a system frame ($0{\leq}$t_id<80), fid is the index of the specified PRACH in the frequency domain ($0{\leq}$f_id<8), SFN is the system frame number of the specified PRACH, 'x' is the maximum allowed value of the ra-ResponseWindow, and ul_carrier_id is the UL carrier used for Msg1 transmission (0 for NUL carrier, and 1 for SUL carrier).

In a second embodiment, the UE may stop monitoring for Random Access Responses (Msg2) as soon as Msg3 has been physically transmitted in response to Msg2 within the ra-ResponseWindow. In this regard, a transmission implies that CCA succeeded for Msg3, however it doesn't necessarily imply that the base unit has received the transmission successfully. In other words, the UE may stop monitoring for Random Access Responses (Msg2) if the physical layer indicates that Msg3 has been transmitted. In this way, if Msg2 is received but CCA for Msg3 fails, the UE still monitors for later Msg2 transmissions until the ra-ResponseWindow stops. The effect is similar to the first embodiment: the base unit can send another Msg2 (with the mentioned constraint of the transport block size) to schedule another Msg3 opportunity, instead of using a PDCCH carrying DCI where the CRC is scrambled with C-RNTI/TC-RNTI triggering a HARQ retransmission of Msg3. In a further enhancement of this embodiment, Msg2 includes an additional redundancy version (RV) parameter to facilitate efficient HARQ combination of different Msg3 transmissions.

In various implementations, the MAC entity behavior may be defined as follows to cover the second embodiment: The MAC entity may stop ra-ResponseWindow (and hence monitoring for Random Access Response(s)) after the physical layer indicates a transmission of RACH Msg3. Alternatively, the MAC entity behavior may be defined as stopping ra-ResponseWindow (and hence monitoring for Random Access Response(s)) after the CCA for Msg3 transmission has succeeded.

Instead or in addition of using the physical layer transmission of Msg3 as a stopping criterion of ra-ResponseWindow, one or more of the following may be used to trigger stopping ra-ResponseWindow: Reception of L2 ACK by UE, where the L2 ACK relates to the successful reception of Msg3 by a base unit; Reception of a PDCCH carrying DCI where the CRC is scrambled with C-RNTI/TC-RNTI requesting a HARQ retransmission of Msg3; and Reception of Msg4 by the UE.

In a third embodiment, the Random Access procedure is continued with a new preamble transmission (Msg1), from the same preamble group as the previous preamble transmission, in case the physical layer is not able to transmit Msg3 in the indicated time slot. The third embodiment shortens the delay until continuing the RACH procedure with selecting and transmitting a PRACH preamble. This may be realized by considering the contention resolution timer ra-ContentionResolutionTimer as expired in case the physical layer is not able to transmit Msg3 in the indicated time slot, e.g. due to a failed CCA. Alternatively, the third embodiment may be realized by considering the Random Access procedure as ongoing or continuing in case the physical layer is not able to transmit Msg3 in the indicated time slot. In an enhancement, the HARQ buffer used for transmission of the MAC PDU in the Msg3 buffer may be flushed.

In case the UE has obtained multiple opportunities for Msg3 transmission, in an alternative to the third embodiment the Random Access procedure is continued with a new preamble transmission (Msg1) from the same preamble group as the previous preamble transmission in case the physical layer is not able to transmit Msg3 in any of the indicated transmission opportunities (e.g., time slots). According to this alternative, the MAC entity considers the Random Access procedure as ongoing or continuing if Msg3 could not be transmitted by the physical layer, e.g. due to a failed CCA, in any of the time slot(s) indicated by Msg2. In certain embodiments, the HARQ buffer used for transmission of the MAC PDU in the Msg3 buffer may be flushed if the UE continues the Random Access procedure with a new preamble.

In a further variant for the case that the UE receives multiple Msg2 transmissions, the MAC entity considers the Random Access procedure as ongoing or continuing if Msg3 could not be transmitted by the physical layer, e.g. due to a failed CCA, in any of the time slot(s) indicated by the plurality of Msg2 transmissions received during ra-ResponseWindow. This may be realized by considering the contention resolution timer ra-ContentionResolutionTimer as expired in case the physical layer is not able to transmit Msg3 in any of the indicated transmission opportunities (e.g., time slots). Alternatively, it may be realized by considering the Random Access procedure as ongoing or continuing in case the physical layer is not able to transmit Msg3 in any of the indicated time slots. In an enhancement, the Msg3 HARQ buffer is flushed if the UE continues the Random Access procedure with a new preamble.

In certain implementations, the UE continues with retransmission(s) of the preamble in case the physical layer is not able to transmit Msg3 in any of the indicated time slot(s), e.g. due to failed CCA. In an enhancement, the HARQ buffer used for transmission of the MAC PDU in the Msg3 buffer is flushed, and the transmit power of the preamble may be increased. In one alternative, the transmission power is increased by a power ramping step size larger than that the configured power ramping step size to be used if the UE did not receive any Msg2 transmission. The power ramping step size can be a predetermined or signaled offset to the configured power ramping step size or correspond to the configured power-ramping step size for case of differentiated Random Access procedure (powerRamping-StepHighPriority parameter).

According to the third embodiment and its alternatives and variants, any retransmission of a preamble, or transmission of a new preamble as a result of the physical layer not being able to transmit Msg3 in the indicated time slot or any of the indicated time slots, is beneficially done with no applied backoff, even if a backoff had been indicated in a Msg2, in order to not introduce additional delay. Alternatively, the backoff value is reduced by scaling the backoff value by a predetermined or signaled scaling factor (e.g., such as the Scaling factor for the backoff indicator (BI) scalingFactorBI parameter) for prioritizing the preamble transmission.

According to a further variant of the third embodiment, a UE may continue monitoring for a retransmission request of Msg3, i.e. PDCCH addressed to either C-RNTI or TC-RNTI, in case the physical layer is not able to transmit Msg3 in any of the indicated time slot(s), while performing a (re)transmission of a PRACH preamble. The contention resolution timer ra-ContentionResolutionTimer, started when the MAC PDU containing Msg3 was delivered from the MAC layer to the PHY layer for transmission, may be still running while UE is (re)transmitting PRACH preamble. For the case that the UE receives a PDCCH requesting a retransmission of Msg3, the UE may stop further transmission(s) of the PRACH preamble and potentially related monitoring for a corresponding RAR. Upon successful reception of a RAR for the preamble (re)transmission, UE may stop the contention resolution timer and continue with Msg3 transmission according to the received RAR.

A fourth embodiment provides for the transmission of Msg3 in one of multiple time slots (or multiple transmission occasions). This embodiment offers multiple transmission opportunities since the UE will have several time slots for which LBT may allow channel access. To this end, Msg2 includes a new "number of Msg3 time slots" (or "number of Msg3 transmission occasions") parameter indicating the number of time slots (or transmission occasions) in which the UE may transmit Msg3. These time slots (or transmission occasions) may be consecutive or distributed, which may also be configured by Msg2.

In one example, Msg2 may indicate a time slot (or transmission occasion) pattern during which Msg3 transmissions are authorized. In another example, the number of potential Msg3 transmission occasions may be indicated to the UE via broadcast system information or dedicated higher-layer (i.e. RRC) signaling, or it is predefined in the specification. The uplink grant field of MAC payload for Random Access Response (RAR) may include one or more Msg3 PUSCH time resource allocation fields (e.g. multiples of 4 bits). The UE determines the size of MAC RAR based on the indicated or predetermined number of potential Msg3 transmission occasions.

In one example, the UE is configured with a set of number of potential Msg3 transmission occasions by higher layers (e.g., RRC) and the RAR indicates one value from the set the UE should use for determining the indicated Msg3 transmission occasions. In another example, the UE also receives an indication of an offset or gap value between consecutive Msg3 transmission occasions in Msg2 RAR or configured by higher layers for determining the indicated Msg3 transmission occasions. In another variant, the UE may be configured with a set of offset or gap values and number of potential Msg3 transmission occasion pairs by higher layers (e.g., RRC) and the Msg2 RAR indicates one value from the set the UE should use for determining the indicated Msg3 transmission occasions. In one variant, the UE may assume the Msg3 PUSCH time and frequency resource allocation is the same in all the indicated Msg3 transmission occasions. If the clear channel assessment succeeds for any of the indicated time slots (or transmission occasions), the UE performs a single Msg3 transmission in the corresponding time slot (or transmission occasion), preferably only in the earliest available.

In one example, the base unit may indicate to the UE, or alternatively the specification may specify the UE, to transmit Msg3 in some (e.g., see fifth embodiment below) or all indicated time slots or transmission occasions in which the clear channel assessment succeeds, with termination of the Msg3 transmission on reception of ACK for Msg3 or on reception of Msg4 by the UE. This improves the existing solutions, because there is no need for an additional downlink retransmission request.

A fifth embodiment provides for the transmission of Msg3 in several transmission opportunities (e.g., time slots). It can be seen as an enhancement of the fourth embodiment, where the difference is that Msg3 may be transmitted in more than a single time slot. It can be seen as multiple HARQ (re)transmissions of the same transport block without the retransmission request feedback loop. According to this embodiment, the base unit includes a "number of Msg3 transmissions" parameter in Msg2 which tells the UE during how many transmission opportunities (e.g., time slots) the Msg3 is to be transmitted. To minimize the risk of losing the unlicensed channel to another node in between those time slots, the time slots are beneficially adjacent in time so that consecutive time slots are occupied by Msg3 transmissions. This embodiment is particularly beneficial if the signal level of Msg3 during one time slot is not sufficient for successful detection at the base unit, and is superior to the existing solution since no additional HARQ retransmission requests are necessary.

In a sixth embodiment, the UE starts the contention resolution timer if the physical layer indicates that Msg3 has been transmitted, i.e. if the CCA procedure for Msg3 succeeded. This saves unnecessary processing efforts by the UE, because it doesn't have to monitor the downlink for Msg4 or Msg3 retransmission requests.

In various implementations, the sixth embodiment may be realized by specifying that Once the physical layer indicates that Msg3 is transmitted, the MAC entity shall: start the ra-ContentionResolutionTimer and restart the ra-ContentionResolutionTimer at each HARQ retransmission in the first symbol after the end of the Msg3 transmission if the physical layer indicates that Msg3 is (re-)transmitted; monitor the PDCCH while the ra-ContentionResolutionTimer is running regardless of the possible occurrence of a measurement gap; if notification of a reception of a PDCCH transmission is received from lower layers; etc.

In a seventh embodiment, a UE receives an indication of the number of potential transmission occasions for Msg3 in a DCI carrying DL assignment information for the transmission of Msg2. For example, DCI format 1_0 with CRC scrambled by RA-RNTI, used to assign resources for the transmission of Msg2, has currently 16 reserved bits, and some or all of the reserved bits can be used to signal the number of potential Msg3 transmission occasions. The number of potential Msg3 transmission occasions may be configured differently and signaled separately (with different bit fields) for each detected preamble, or alternatively may be set to be common for all detected preambles and signaled with a common bit field. This can save resources in the Msg2 payload, as the corresponding information is contained in the DCI, and the DCI size is not modified since only a plurality of currently designated "reserved" bits is changed.

In one example, the UE is configured with a set of number of potential Msg3 transmission occasions by higher layers (e.g., RRC) and the DCI carrying DL assignment information for the transmission of Msg2 indicates one value from the set the UE should use for determining the indicated Msg3 transmission occasions.

In one example, the UE also receives an indication of an offset or gap value between consecutive Msg3 transmission occasions in the DCI for determining the indicated Msg3 transmission occasions. The UE may be configured with a set of offset or gap value and number of potential Msg3 transmission occasions pairs by higher layers (e.g., RRC) and the DCI carrying DL Msg2 assignment information indicates one value from the set the UE should use for determining the allowed Msg3 transmission occasions.

In one variant, the UE may assume the Msg3 PUSCH time and frequency resource allocation is the same in all the indicated Msg3 transmission occasions. If the clear channel assessment succeeds for any of the indicated time slots (or transmission occasions), the UE performs a single Msg3 transmission in the corresponding time slot (or transmission occasion), preferably only in the earliest available.

In one example, the base unit may indicate to the UE or the specification may specify the UE to transmit Msg3 in some (e.g., see fifth embodiment) or all indicated time slots or transmission occasions in which the clear channel assessment succeeds, with termination of the Msg3 transmission on reception of ACK for Msg3 or on reception of Msg4 by the UE. This improves the existing solutions, because there is no need for an additional downlink retransmission request.

In various implementations, the seventh embodiment may be realized by selecting, for example, two bits to indicate the number of potential Msg3 transmission occasions common to all detected preambles in DCI. For example, in addition to frequency domain and time domain resource assignments, MCS information, and TB scaling, the information transmitted by means of the DCI format 1_0 with CRC scrambled by RA-RNTI may include 2 bits indicating the number of potential Msg3 transmission occasions, thereby reducing the number of reserved bits to 14 bits.

The above embodiments have been generally described for the case of a random access procedure based on four steps, however this should not be construed as limiting the embodiments and solutions to that case. Specifically, in a random access procedure consisting of only two steps, where the base unit assigns PUSCH resources in Msg2, the embodiments described for Msg3 can applied to the PUSCH transmission indicated by Msg2 by making necessary alterations while not affecting the main point at issue.

The above embodiments have been generally described for the case of a contention-based random access procedure (CBRA), however this should not be construed as limiting the embodiments and solutions to that case. Specifically, in a contention-free random access procedure (CFRA), the base unit orders a UE to perform the random access procedure by assigning a PRACH preamble by means of a DCI (the so-called RACH order). In such a case, the UE is to respond with that indicated preamble in Msg1, whereupon the base unit assigns regular PUSCH resources in Msg2. Even though the PUSCH resources assigned by Msg2 could be seen as not strictly being part of the random access procedure, the embodiments described for Msg3 can applied to the PUSCH transmission indicated by Msg2 in CFRA making necessary alterations while not affecting the main point at issue. For example, when applying the third embodiment to the CFRA case, the UE continues with retransmission(s) of the preamble in case the physical layer is not able to transmit the PUSCH indicated by Msg2 in the indicated occasion(s) e.g. due to failed CCA.

In an eighth embodiment, a DCI (e.g. a so-called RACH order) that indicates a PRACH preamble to a UE to be used in a random access procedure, that DCI additionally includes a parameter indicating the number of transmission occasions for the PRACH. Like for Msg3 transmission according to above embodiments, also Msg1 (i.e. the preamble) may be subject to a CCA procedure before the physical layer is allowed to transmit the PRACH. Therefore, particularly the third and fourth embodiments (including variants/alternatives) described for Msg3 can be applied to Msg1 making necessary alterations while not affecting the main point at issue.

FIG. 1 depicts an embodiment of a wireless communication system 100 for efficient RACH behavior, such as for NR-U, according to various embodiments of the disclosure. In one embodiment, the wireless communication system 100 includes remote units 105 and base units 110. Even though a specific number of remote units 105 and base units 110 are depicted in FIG. 1, one of skill in the art may recognize that any number of remote units 105 and base units 110 may be included in the wireless communication system 100.

In one embodiment, the remote units 105 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle onboard computers, network devices (e.g., routers, switches, modems), aerial vehicles, drones, or the like. In some embodiments, the remote units 105 include wearable devices, such as smart watches, fitness bands, optical head-mounted displays, or the like. Moreover, the remote units 105 may be referred to as subscriber units, mobiles, mobile units, mobile stations, users, terminals, mobile terminals, fixed terminals, subscriber stations, UE, user terminals, a device, or by other terminology used in the art.

In various embodiments, the base units 110 may be distributed over a geographic region. In certain embodiments, a base unit 110 may also be referred to as a RAN node, an access point, an access terminal, a base, a base station, a Node-B, and eNB, an gNB, a Base unit, a Home Node-B, a relay node, a device, a core network, an aerial server, or by any other terminology used in the art. In some embodiments, the base units 110 are part of a radio access network that includes one or more controllers communicably coupled to one or more corresponding base units 110. In certain embodiments, the radio access network is communicably coupled to one or more core networks, which may be coupled to other networks, like the Internet and public switched telephone networks, among other networks. These and other elements of radio access and core networks are not illustrated but may be known by those having ordinary skill in the art.

In one implementation, the wireless communication system 100 is compliant with the 3GPP protocol, wherein the base unit 110 transmits using an OFDM modulation scheme on the DL and the remote units 105 transmit on the UL using a SC-FDMA scheme or an OFDM scheme. In various embodiments, the wireless communication system 100 may use some other open or proprietary communication protocol, for example, WiMAX, among other protocols. The present disclosure is not intended to be limited to the implementation of any particular wireless communication system architecture or protocol.

The base units 110 may serve a number of remote units 105 within a serving area, for example, a cell or a cell sector via a wireless communication link. The base units 110 transmit DL communication signals to serve the remote units 105 in the time, frequency, and/or spatial domain. The remote units 105 may communicate directly with one or more of the base units 110 via UL communication signals. In various embodiments, the DL and UL communication signals are sent over unlicensed spectrum. It should be further noted that although various embodiments depicted in FIGS. 1-8 may be described in the context of unlicensed transmission/cell, e.g. NR-U, the embodiments should be also applicable to licensed cells, e.g. NR or LTE.

In various embodiments, the remote unit 105 may synchronize to a cell of a base unit 110 and receive a system information block indicating various capabilities and parameters of the cell. The remote unit 105 later determines to initiate a RACH procedure and sends a RACH Msg1 to initiate a RACH procedure 115 (e.g., PRACH preamble) to the base unit 110. In response, in various embodiments, the base unit 110 may indicate 120 parameters that provide efficient RACH behavior such as multiple transmission opportunities for individual message completion, random access response window modifications, reduced backoff continuation of the RACH procedure, etc. In some embodiments, the efficient behavior minimizes one or more delays to successfully complete a random access which may occur in an unmodified RACH procedure, such as for example, as specified in Release 15. For example, in certain embodiments, the base unit 110 may send multiple RACH Msg2 (e.g., random access responses) to the remote unit 105. In circumstances in which one or more initial Such RACH Msg2 messages are sent by the transmitter of the base station but not received by the receiver of the remote unit due to interference or poor reception, such efficient behavior may prevent a delay associated with having to wait for a random access window to expire before continuing the RACH procedure with selecting and transmitting a PRACH preamble. Additionally, the remote unit 105 and base unit 110 may minimize a RACH procedure delay utilizing the efficient RACH behavior described herein.

Figure 2:
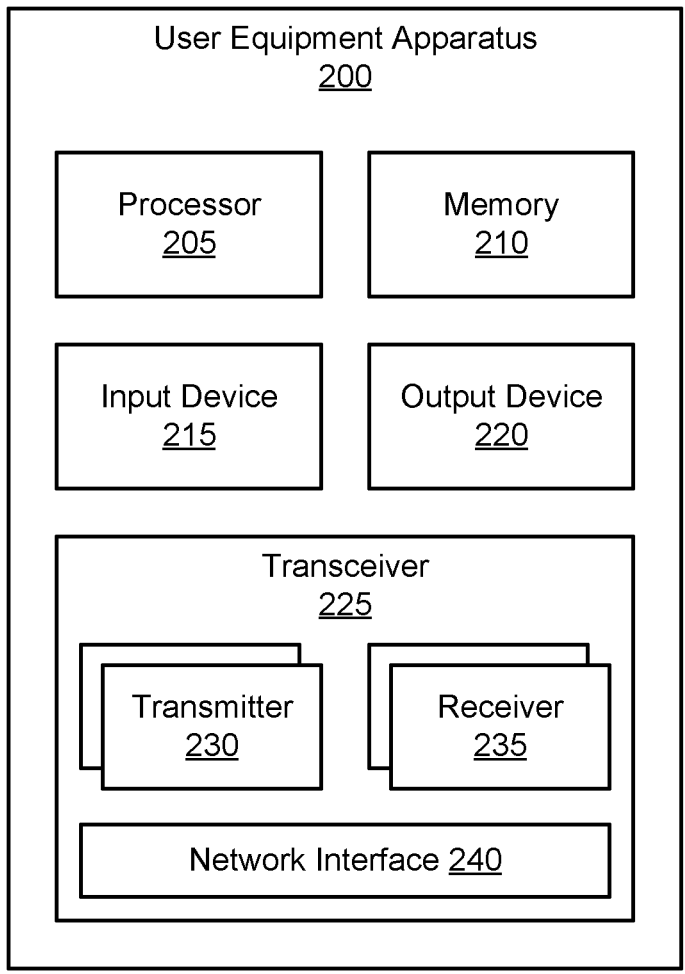
FIG. 2 is a schematic block diagram illustrating one embodiment of a user equipment apparatus that may be used for efficient RACH behavior.

FIG. 2 depicts one embodiment of a user equipment apparatus 200 that may be used for may be used for efficient RACH behavior, such as for NR-U, according to embodiments of the disclosure. The user equipment apparatus 200 may be one embodiment of the remote unit 105 or UE, described above. Furthermore, the user equipment apparatus 200 may include a processor 205, a memory 210, an input device 215, an output device 220, and a transceiver 225. In various embodiments, the transceiver 225 includes a transmitter 230, a receiver 235, and a network interface 240. In some embodiments, the input device 215 and the output device 220 are combined into a single device, such as a touchscreen. In certain embodiments, the user equipment apparatus 200 may not include any input device 215 and/or output device 220. In various embodiments, the user equipment apparatus 200 may include one or more of the processor 205, the memory 210, and the transceiver 225, and may not include the input device 215 and/or the output device 220.

The processor 205, in one embodiment, may include any known controller capable of executing computer-readable instructions and/or capable of performing logical operations. For example, the processor 205 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 205 executes instructions stored in the memory 210 to perform the methods and routines described herein. The processor 205 is communicatively coupled to the memory 210, the input device 215, the output device 220, and the transceiver 225.

The memory 210, in one embodiment, is a computer readable storage medium. In some embodiments, the memory 210 includes volatile computer storage media. For example, the memory 210 may include a RAM, including dynamic RAM ("DRAM"), synchronous dynamic RAM ("SDRAM"), and/or static RAM ("SRAM"). In some embodiments, the memory 210 includes non-volatile computer storage media. For example, the memory 210 may include a hard disk drive, a flash memory, or any other suitable non-volatile computer storage device. In some embodiments, the memory 210 includes both volatile and non-volatile computer storage media.

In some embodiments, the memory 210 stores data related to modifying a radio capability. For example, the memory 210 may store parameters indicating RACH message transmission opportunities, backoff value scaling parameters, and the like. In certain embodiments, the memory 210 also stores program code and related data, such as an operating system or other controller algorithms operating on the remote unit 105.

The input device 215, in one embodiment, may include any known computer input device including a touch panel, a button, a keyboard, a stylus, a microphone, or the like. In some embodiments, the input device 215 may be integrated with the output device 220, for example, as a touchscreen or similar touch-sensitive display. In some embodiments, the input device 215 includes a touchscreen such that text may be input using a virtual keyboard displayed on the touchscreen and/or by handwriting on the touchscreen. In some embodiments, the input device 215 includes two or more different devices, such as a keyboard and a touch panel.

The output device 220, in one embodiment, is designed to output visual, audible, and/or haptic signals. In some embodiments, the output device 220 includes an electronically controllable display or display device capable of outputting visual data to a user. For example, the output device 220 may include, but is not limited to, an LCD display, an LED display, an OLED display, a projector, or similar display device capable of outputting images, text, or the like to a user. As another, non-limiting, example, the output device 220 may include a wearable display separate from, but communicatively coupled to, the rest of the user equipment apparatus 200, such as a smart watch, smart glasses, a heads-up display, or the like. Further, the output device 220 may be a component of a smart phone, a personal digital assistant, a television, a table computer, a notebook (laptop) computer, a personal computer, a vehicle dashboard, or the like.

In certain embodiments, the output device 220 includes one or more speakers for producing sound. For example, the output device 220 may produce an audible alert or notification (e.g., a beep or chime). In some embodiments, the output device 220 includes one or more haptic devices for producing vibrations, motion, or other haptic feedback. In some embodiments, all or portions of the output device 220 may be integrated with the input device 215. For example, the input device 215 and output device 220 may form a touchscreen or similar touch-sensitive display. In other embodiments, the output device 220 may be located near the input device 215.

The transceiver 225 includes at least transmitter 230 and at least one receiver 235. One or more transmitters 230 may be used to provide UL communication signals to a base unit 110, such as the UL transmissions described herein. Similarly, one or more receivers 235 may be used to receive DL communication signals from the base unit 110, as described herein. Although only one transmitter 230 and one receiver 235 are illustrated, the user equipment apparatus 200 may have any suitable number of transmitters 230 and receivers 235. Further, the transmitter(s) 230 and the receiver(s) 235 may be any suitable type of transmitters and receivers. In one embodiment, the transceiver 225 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 225, transmitters 230, and receivers 235 may be implemented as physically separate components that access a shared hardware resource and/or software resource, such as for example, the network interface 240.

In various embodiments, one or more transmitters 230 and/or one or more receivers 235 may be implemented and/or integrated into a single hardware component, such as a multi-transceiver chip, a system-on-a-chip, an ASIC, or other type of hardware component. In certain embodiments, one or more transmitters 230 and/or one or more receivers 235 may be implemented and/or integrated into a multi-chip module. In some embodiments, other components such as the network interface 240 or other hardware components/circuits may be integrated with any number of transmitters 230 and/or receivers 235 into a single chip. In such embodiment, the transmitters 230 and receivers 235 may be logically configured as a transceiver 225 that uses one more common control signals or as modular transmitters 230 and receivers 235 implemented in the same hardware chip or in a multi-chip module.

Referring now to the structures and functions used or performed by the processor 205 for enhancing RACH behavior, such as for NR-U, in various embodiments as described above, the processor 205 controls the transceiver 225 to send a PRACH preamble to a base unit to start a RACH procedure. Moreover, the processor 205 may receive a random access response from the base unit during a random access response window. In various embodiments, the processor 205 controls the transmitter 230 to transmit a second PRACH preamble in response to being unable to transmit a RACH Msg3 within an indicated RACH Msg3 transmission opportunity.

In the description above, certain embodiments are numbered respectively as first, second, third, fourth, fifth, six, seventh and eight embodiments. Here, the messages and functions used and performed by the processor 205 are described in an alternate order.

As used herein, the term "transmission opportunity" means an opportunity or occasion that is indicated for a base unit and/or a remote unit to transmit a message or other data item and does not necessarily mean that a transmission occurs. In some embodiments, transmission opportunities are provided as predetermined time slots and/or a number of occasions provided for transmitting.

The third embodiment includes message structures and functions which the processor 205 may use to provide efficient RACH behavior by transmitting a second PRACH preamble in response to being unable to transmit a RACH Msg3 indicated RACH Msg3 transmission opportunity.

The fourth and fifth embodiments include messages and functions which the processor 205 may use to obtain multiple Msg3 transmission opportunities and/or multiple Msg3 transmissions where the number of transmission opportunities and/or Msg3 transmissions is conveyed in Msg2.

The seventh and eighth embodiments are similar to the fourth and fifth embodiments except that instead of the processor 205 receiving a parameter with the number of transmission opportunities and/or the number of Msg3 transmissions in Msg2, the parameter with the number of transmission opportunities and/or Msg3 transmissions is conveyed in DCI carrying DL assignment information for the reception of Msg2. The eighth embodiment may also apply to the third embodiment, e.g., the parameter with a number of transmission opportunities and/or Msg1 PRACH Preamble transmissions is conveyed in DCI carrying DL assignment information for the Msg1 transmission.

The first embodiment includes message structures and functions which the processor 205 may monitor for more than one Msg2.

The second embodiment includes message structures and functions which the processor 205 may use to modify the behavior of the random access response window.

The sixth embodiment includes structures and functions which the processor 205 may use to modify conditions to start the ra-ContentionResolution timer and/or to restart the ra-ContentionResolution timer.

Referring now in more detail to various embodiments, such as for example, the embodiment described above as the "third embodiment." In one embodiment, the user equipment apparatus 200 includes a transceiver 225 that includes a transmitter 230 and a receiver 235. In the embodiment, the transmitter 230 transmits a first PRACH preamble to a base unit to start a RACH procedure. In the embodiment, the receiver 235 receives a random access response from the base unit within a random access response window. The user equipment apparatus 200 includes a processor 205 that controls the transmitter 230 to transmit a second PRACH preamble in response to being unable to transmit a RACH Msg3 within an indicated RACH Msg3 transmission opportunity.

In various embodiments, the RACH Msg3 comprises a contention request. In some embodiments, the second PRACH preamble is selected from the same preamble group as the first PRACH preamble. As explained above, the RACH procedure is continued with a second PRACH preamble transmission (RACH Msg1), from the same preamble group as the previous preamble transmission, in case the physical layer is not able to transmit Msg3 in the indicated time slot e.g., in an indicated transmission opportunity. By transmitting the second PRACH preamble in response to the physical layer indicating that it is not able to transmit Msg3 because the Clear Channel Assessment e.g., listen-before-talk procedure fails, this avoids a delay associated with the unmodified RACH procedure e.g., of Release 15 which waits until the random access window expires before continuing the RACH procedure with selecting and transmitting a PRACH preamble.

In certain embodiments, the processor 205 considers a contention resolution timer e.g., ra-ContentionResolution-Timer to be expired in response to being unable to transmit the RACH Msg3 within the indicated RACH Msg3 transmission opportunity. In other words, the RACH procedure proceeds as if the contention resolution timer had expired without having to incur the delay associated with letting it expire according to an unmodified RACH procedure. In some embodiments, being unable to transmit the RACH Msg3 within the indicated RACH Msg3 transmission opportunity includes failing to successfully perform a clear channel assessment (CCA) e.g., an LBT procedure, for the RACH Msg3. This may particularly improve the RACH behavior in an NR-U system since LBT failures may be one of the more common reasons a message fails to be transmitted in NR-U.

In certain embodiments, the processor 205 considers the RACH procedure as continuing in response to being unable to transmit the RACH Msg3 within the indicated RACH Msg3 transmission opportunity. In other words, in response to a CCA/LBT failure, rather than considering the RACH procedure as not successfully completing within the random access response window, the RACH procedure continues and the processor 205 controls the transmitter 230 to transmit a second PRACH preamble.

Of course, as explained above, the user equipment apparatus 200 may successfully transmit RACH Msg1 and may receive a random access response (RACH Msg2) but may fail to successfully transmit a RACH Msg3. In systems such as NR-U, failure to successfully transmit a RACH Msg3 may also be due to a failed CCA/LBT. Rather than waiting for the random access window to expire as in an existing unmodified RACH procedure, in various embodiments of the efficient RACH behavior, such as for example, the fourth and fifth embodiments described above, the processor 205 obtains a plurality of RACH Msg3 transmission opportunities comprising the indicated RACH Msg3 transmission opportunity. In various embodiments, the processor 205 obtains the plurality of RACH Msg3 transmission opportunities as communicated in the random access response (RACH Msg2).

In other embodiments, such as the seventh and eighth embodiments described above, the processor 205 obtains the plurality of RACH Msg3 transmission opportunities as communicated in a DCI carrying downlink assignment information for transmission of the random access response. In various embodiments, the processor 205 controls the transmitter 230 to transmit more than one RACH Msg3 in the plurality of RACH Msg3 transmission opportunities.

Of course, as explained above, with regard to multiple transmission opportunities for RACH Msg1 which occurs before RACH Msg2, other message structures and functions may be used to convey information about a second PRACH preamble to be transmitted in response to a failure such as a CCA/LBT failure. In various embodiments, the processor 205 receives a DCI indicating a PRACH preamble to be used in the RACH procedure ("RACH Order") and a parameter indicating a predetermined number of RACH Msg3 transmission opportunities. In certain embodiments, the processor 205 receives a DCI indicating a PRACH preamble to be used in the RACH procedure ("RACH Order") and a parameter indicating a predetermined number of RACH Msg1 transmission opportunities.

In various embodiments, multiple opportunities for successfully receiving a random access response (Msg2) may also be obtained in the efficient RACH behavior. In some embodiments, the processor 205 monitors for more than one random access response transmitted within the random access response window. In various embodiments, the processor 205 stops monitoring for the more than one random access response in response to performing a successful clear channel assessment for transmitting the RACH Msg3. In some embodiments, a MAC entity of the user equipment apparatus 200 considers the RACH procedure as ongoing in response to not being able to transmit the RACH Msg3 within an indicated RACH Msg3 transmission opportunity for transmitting the RACH Msg3.

Other enhancements to the RACH behavior may further minimize delays associated with unmodified RACH behavior that may occur in existing systems such as Release 15. In certain embodiments, the processor 205 controls the transmitter 230 to transmit the second PRACH preamble using a reduced backoff value in response to being unable to transmit the RACH Msg3 within the indicated RACH Msg3 transmission opportunity. In some embodiments, the reduced backoff value overrides a backoff value indicated in the random access response. In various embodiments, the reduced backoff value is obtained by applying a scaling factor to the backoff value indicated in the random access response. In various embodiments, the scaling factor applied to the backoff values is a scaling parameter for a backoff indicator (e.g., such as the scaling factor for the backoff indicator (BI) scalingFactorBI parameter) for prioritizing transmission of the first PRACH preamble.

In certain embodiments, the processor 205 continues monitoring for a Physical Downlink Control Channel ("PDCCH") requesting retransmission of the RACH Msg3, the PDCCH addressed to an identifier selected from a Cell Radio Network Temporary Identifier ("C-RNTI") and a Temporary Cell Radio Network Temporary Identifier ("TC-RNTI").

In some embodiments, in response to not being able to transmit the RACH Msg3 in the indicated RACH Msg3 transmission opportunity, the processor 205 further continues monitoring for a Physical Downlink Control Channel ("PDCCH") requesting retransmission of the RACH Msg3, the PDCCH addressed to an identifier selected from a Cell Radio Network Temporary Identifier ("C-RNTI") and a Temporary Cell Radio Network Temporary Identifier ("TC-RNTI") while performing a transmission of the second PRACH preamble.

In some embodiments, such as the third embodiment described above, the contention resolution timer ra-ContentionResolutionTimer, started when the MAC PDU containing Msg3 was delivered from MAC layer to PHY layer for transmission, may be still running while the user equipment apparatus 200 is transmitting the first or second PRACH preamble. In embodiments in which the receiver 235 of the user equipment apparatus 200 receives a PDCCH requesting a retransmission of Msg3, the processor 205 may stop further transmission(s) of the PRACH preamble and potentially related monitoring for a corresponding RAR. In response to receiving a PDCCH requesting retransmission of the RACH Msg3, the processor 205 may stop further transmissions of the second PRACH preamble and accordingly may also stop monitoring for a corresponding random access request.

In certain embodiments, such as the sixth embodiment described above, in response to performing a successful clear channel assessment for the RACH Msg3, the processor 205 starts a contention resolution timer. As explained above, this saves unnecessary processing efforts by the user equipment apparatus 200, since the processor 205 doesn't have to monitor the downlink for Msg4 or Msg3 retransmission requests.

In some embodiments, in response to successfully receiving a random access response for the second PRACH preamble, the processor 205 stops the contention resolution timer and controls the transmitter 230 to transmit the RACH Msg3 according to the received random access response.

Referring now in more detail to the fourth and fifth embodiments which obtain multiple transmission opportunities for the user equipment apparatus 200 to transmit the contention request (or other RACH Msg3). In certain embodiments, such as the fourth embodiment described above, minimizing the delay includes obtaining a plurality of transmission opportunities to transmit a contention request (or other RACH Msg3) during the random access response window. In some embodiments, the processor 205 continues the RACH procedure with selecting and transmitting a PRACH preamble in response to being unable to transmit the contention request (or other RACH Msg3) during the random access response window.

In various embodiments, the receiver 235 receives a predetermined number for the plurality of transmission opportunities in which the user equipment apparatus 200 may transmit the contention request (or other RACH Msg3) and communicates the predetermined number to the processor 205. In some embodiments, the predetermined number is received in the random access response which is also referred to herein as a Msg2 and/or an RAR.

In one embodiment, the processor 205 determines a MAC payload size for the random access response based on the predetermined number. As explained above, the uplink grant field of the MAC payload for random access response (RAR) may include one or more Msg3 PUSCH time resource allocation fields (e.g., multiples of four bits). The user equipment apparatus 200 determines the size of the MAC RAR, based on the indicated or predetermined number of potential Msg3 transmission occasions received by the processor 205, which in some embodiments, is received in the RAR. Since the MAC PDU consists of a MAC header and one or more MAC random-access responses, the MAC payload size, in such embodiments, equals the size of each MAC RAR times the predetermined number of transmission opportunities received by the processor 205 e.g., in the random-access response.

In various embodiments, the transmission opportunities are distributed according to a time slot pattern received in the random-access response message. In other words, as explained above, in such embodiments, Msg2 can indicate a time slot or transmission opportunity pattern during which the Msg3 transmissions are authorized.

It may be noted that as used herein, that while the receiver 235 of the user equipment apparatus 200 receives RF data transmitted by a transmitter of a base station, the processor 205 receives the content and/or values within the RF data received by the receiver 235 and may take actions in response to receiving such content and/or values. Likewise, when data is transmitted by the transmitter 230 of the user equipment apparatus 200, the receiver 335 of the base unit 110 receives the RF data transmitted by the user equipment apparatus 200 and a processor of the base unit 110 receives the content and/or values within the RF data received by a receiver of the base unit 110.

In some embodiments, the processor 205 receives the predetermined number of transmission opportunities for transmitting the contention request via a mode other than in the random-access response. For example, in certain embodiments, the processor 205 receives the predetermined number of transmission opportunities for transmitting the contention request via broadcast system information.

In other embodiments, the processor 205 receives the predetermined number of transmission opportunities for transmitting the contention request via higher level signaling. As used herein, the term "higher layer signaling" may be used to refer to layers above the PHY layer (according to the OSI model), include the MAC layer (e.g. MAC CE), RRC layer, and further layers above, and their corresponding signals and messages, unless otherwise clear from context.

In further embodiments, the processor 205 receives the predetermined number of transmission opportunities for transmitting the contention request based on the predetermined number been established in a specification for a particular Release, where the term "Release" may refer to a 3GPP implementation of features at a given point in time. In certain embodiments, the processor 205 applies a contention request physical uplink shared channel (PUSCH) time and frequency allocation that is the same for the plurality of transmission opportunities. Such embodiments help to save time and minimize delay while ensuring proper function by avoiding the need to determine PUSCH time and frequency allocations for each of the plurality of transmission opportunities.

In various embodiments, the processor 205 causes the transmitter 230 to transmit a single contention request at an at an earliest transmission opportunity for which a clear channel assessment is successful. As used herein, the term "clear channel assessment" may also be referred to as a listen-before-talk ("LBT") procedure. In other words, as explained above, if the physical layer indicates that Msg3 has been transmitted (e.g., after the clear channel assessment succeeds) for any of the indicated time slots (or transmission opportunities), the UE performs a single Msg3 transmission in the corresponding time slot (or transmission opportunity), for example, in the earliest available transmission opportunity (e.g., the earliest transmission opportunity for which a clear channel assessment is successful).

In certain embodiments, the processor 205 causes the transmitter 230 to transmit the contention request in any of the plurality of transmission opportunities for which a successful clear channel assessment is performed.

In some embodiments, the processor 205 causes the transmitter 230 not to transmit an additional contention Msg3 in response to receiving one of: an acknowledgement for the contention request and a contention resolution message. In other words, the processor 205 terminates further Msg3 transmission opportunities on reception of ACK for Msg3 or on reception of a contention or a message (Msg4) by the UE. This improves the provides an improvement over the existing solutions, since there is no need for an additional downlink retransmission request, thus helping the user equipment apparatus 200 minimize RACH procedure delay that may occur in RACH procedures, such as provided in Release 15.

Referring now to the "fifth embodiment" described above, in certain embodiments, the processor 205 controls the transmitter 230 to transmit a plurality of contention requests corresponding to the plurality of transmission opportunities. The fifth embodiment is similar to the fourth embodiment with the additional feature that multiple Msg3 may be transmitted rather than transmitting one Msg3 in one of multiple transmission opportunities as described in the fourth embodiment. Thus, the fifth embodiment may be seen as an enhancement of the fourth embodiment, where a difference between the fifth embodiment and the fourth embodiment is that Msg3 may be transmitted in more than a single time slot. It may further be seen as effectively performing the function of multiple HARQ retransmissions of the same transport block without incurring the delay associated with the HARQ retransmission request feedback loop. In such embodiments, the processor 205 may receive a predetermined number of contention requests to transmit.

In certain embodiments, to minimize the risk of losing an unlicensed channel to another node in between time slots, the transmission opportunities may include multiple adjacent time slots so that consecutive time slots are occupied by Msg3 transmissions. This embodiment is particularly beneficial if the signal level of Msg3 during one time slot is not sufficient for successful detection at the base unit, and is superior to the existing solution since no additional HARQ retransmission requests are necessary.

In some embodiments, the processor 205 causes the transmitter 230 to transmit the contention requests in more than one of the plurality of transmission opportunities in response to performing a successful clear channel assessment for the more than one transmission opportunities.

Furthermore, in various embodiments, the processor 205 may cause the transmitter 230 to transmit the contention requests in more than one of the plurality of transmission opportunities in response to performing a successful clear channel assessment i.e., a successful LBT procedure for the more than one transmission opportunities. In other words, once the physical layer indicates that the transmitter 230 has transmitted the contention request, additional contention requests may be transmitted in other transmission opportunities without waiting to determine whether the transmitted contention request has been received by the base unit 110.

Referring now to the seventh and eighth embodiments which also include structures and functions which the processor 205 may use to minimize RACH procedure delay that may occur in systems using unmodified RACH procedures where the delay is related to Msg3 failure such as failure to gain channel access due to a CCA/LBT failure. In many respects, the seventh embodiment described above is similar to the fourth and fifth embodiments also described above with one difference being that the in the seventh embodiment, instead of conveying information about the number of transmission opportunities in the random-access response message (Msg3) information about the number of transmission opportunities is conveyed in the DCI carrying downlink information.

For example, in certain embodiments, multiple Msg3 transmission opportunities are supported and conveyed to the user equipment apparatus 200 in the DCI carrying downlink assignment information rather than in Msg2, the random-access response as described above with respect to the fourth and fifth embodiments.

For example, in some embodiments, the processor 205 receives the predetermined number for the plurality of transmission opportunities in which the user equipment apparatus 200 may transmit the contention request includes receiving downlink control information ("DCI") indicating the predetermined number of transmission opportunities for transmitting a contention request during the random-access response window. For example, DCI format 1_0 with CRC scrambled by RA-RNTI, used to assign resources for the transmission of Msg2, has currently 16 reserved bits, and some or all of the reserved bits can be used to signal the number of potential Msg3 transmission occasions.

In certain embodiments, the number of potential Msg3 transmission occasions may be configured differently and signaled separately (with different bit fields) for each detected preamble, or alternatively may be set to be common for all detected preambles and signaled with a common bit field. This can save resources in the Msg2 payload, as the corresponding information is contained in the DCI, and the DCI size is not modified since only a plurality of currently designated "reserved" bits is changed.

In certain embodiments, the parameter indicating the predetermined number of transmission opportunities is encoded within two bits of the DCI and is configurable for each detected PRACH preamble. Alternatively, in some embodiments, the predetermined number of transmission opportunities may be set to be common for all detected preambles and signaled with a common bit field. This can save resources in the Msg2 payload, as the corresponding information is contained in the DCI, and the DCI size is not modified since only a plurality of currently designated "reserved" bits is changed. For example, in Release 15, two of the 16 reserved bits may be used for encoding the number of potential Msg3 transmission opportunities.

In various embodiments, the processor 205 receives a configuration comprising a set of candidate numbers of potential transmission opportunities for transmitting the contention request, where the parameter indicates a particular one of the set of candidate numbers of potential transmission opportunities for transmitting the contention request. In one example, the user equipment apparatus 200 receives a set of numbers of potential Msg3 transmission occasions conveyed by higher layer signaling (e.g., RRC) and the DCI carrying DL assignment information for the transmission of Msg2 indicates one value from the set the UE should use for determining the indicated Msg3 transmission occasions. By way of illustration, in one example, two bits may be used to select any of four numbers (e.g., 2, 4, 8, 16) from within a set of possible transmission opportunities where binary sequence "00" may indicate two transmission opportunities, "01" may indicate four transmission opportunities, "10" may indicate eight transmission opportunities, and "11" may indicate sixteen transmission opportunities.

In certain embodiments, the processor 205 receives via the DCI, an offset value between consecutive transmission opportunities for the contention request. In other words, the user equipment apparatus 200 receives an indication of an offset or gap value between consecutive Msg3 transmission occasions in the DCI for determining the indicated Msg3 transmission occasions. The user equipment apparatus 200 may be configured with a set of offset or gap value and number of potential Msg3 transmission opportunities by higher layer signaling (e.g., RRC) and the DCI carrying DL assignment information for the transmission of Msg2 assignment information indicates one value from the set which the user equipment apparatus 200 should use for determining the indicated Msg3 transmission occasions.

In some embodiments, the processor 205 applies the same contention request PUSCH time and the same frequency allocation for the plurality of opportunities. In various embodiments, the processor 205 causes the transmitter 230 to transmit a single contention request within the plurality of transmission opportunities, the single contention request being transmitted at an earliest opportunity of the transmission opportunities for which a clear channel assessment is successful.

In various embodiments, the processor 205 causes the transmitter 230 to not transmit an additional contention request in response to receiving one of an acknowledgement for the contention request and a contention resolution message. In some embodiments, the processor 205 receives a predetermined number of contention requests to transmit. In some embodiments, the transmission opportunities include consecutive adjacent time slots.

For example, in certain embodiments, the processor 205 causes the transmitter to transmit contention requests in more than one of the plurality of transmission opportunities in response to performing a successful clear channel assessment for the more than one transmission opportunities.

Referring now to the eighth embodiment described above, the eighth embodiment supports assigning multiple transmission opportunities by a single PDCCH order also sometimes referred as a RACH order. The DCI proceeding the transmission of a PRACH preamble (Msg1) starts the RACH procedure so at the time the DCI is received there is no ongoing RACH procedure. In some embodiments, such as for example the eighth embodiment described above, minimizing the delay includes receiving in a DCI indicating the PRACH preamble to be used during the RACH procedure ("RACH order"), a parameter indicating a predetermined number of transmission opportunities for transmitting the first PRACH preamble to the base unit 110.

In other words, in various embodiments, such as variations of the eighth embodiment described above, a DCI such as a RACH order indicates a PRACH preamble to the user equipment apparatus 200 be used in a random-access procedure, that DCI additionally includes a parameter indicating the number of transmission opportunities for the transmitting the PRACH. Similar to the way that transmission opportunities for Msg3 transmission may be subject to a clear channel assessment i.e., an LBT procedure before the physical layer may transmit the one or more contention requests (Msg3), in embodiments where the user equipment apparatus obtains multiple transmission opportunities to transmit the PRACH preamble, the processor 205 causes a clear channel assessment to be performed before transmitting any message to minimize the likelihood that the message may interfere with other transmissions e.g., on the unlicensed media. Similarly, the variants and alternative embodiments that are described above with respect to the multiple transmission opportunities for Msg3 may also apply to multiple transmission opportunities for Msg1 taking into account that the DCI for the RACH Order should be used for conveyed information about transmitting the second PRACH preamble rather than DCI for the Msg3 as explained above with respect to embodiments such as the fourth and fifth embodiments described above.

Referring now to the first embodiment which includes structures and functions which the processor 205 may use to enhance RACH behavior and in various embodiments, to minimize RACH procedure delay related to Msg2 failure may occur in existing systems using an unmodified RACH procedure where the efficient RACH behavior minimizes the delay by monitoring for more than one Msg2. In one embodiment, referred to above as the first embodiment, the processor 205 of the user equipment apparatus 200 minimizes the RACH procedure delay relative to the delay that would occur in unmodified RACH procedures such as for example in Release 15, by monitoring for more than one random-access message during the random-access response window even after the processor 205 has successfully received a random-access response message containing random-access preamble identifiers that match the transmitted PRACH preamble which is to say after the random-access response reception is considered successful. In various embodiments, the processor 205 controls the transmitter 230 to transmit contention request (Msg3) during the random-access response window where the contention request is sent in response to receiving the random-access response message.

In some embodiments, in order to avoid conflicting or unclear behavior with respect to the contention request transmission, the additional random access response indicates the same contention request transport block size as the random access response. Said another way, the UE may expect that multiple Msg2 transmissions indicate the same Msg3 transport block parameters, such that the transport block size indicated by two or more Msg2 transmissions within the ra-ResponseWindow does not change. This simplifies the implementation for the user equipment apparatus 200 because the same data payload can be kept in the transmission buffer.

The efficient behavior of the user equipment apparatus 200 according to this first embodiment indicates that the base unit 110 may perform multiple Msg2 transmissions within the same ra-ResponseWindow. From the lack of successful Msg3 reception (e.g., by DTX detection on Msg3 PUSCH resource or associated reference signal corresponding to Msg3), the base unit 110 cannot know whether the user equipment apparatus 200 was missing a Msg2 transmission, or whether channel access was not allowed due to a failed LBT procedure. According to current specification, in case the user equipment apparatus 200 has missed Msg2 reception, the user equipment apparatus 200 continues to monitor for PDCCH with CRC scrambled by RA-RNTI throughout the ra-Response Window until it receives a valid PDCCH with CRC scrambled by RA-RNTI and the Random Access Response containing Random Access Preamble identifier that matches the transmitted PRACH preamble index.

Therefore, the base unit 110 cannot be sure whether a HARQ retransmission grant can be interpreted correctly by the user equipment apparatus 200, as that requires a successful reception of Msg2 addressed to the UE. To facilitate this improvement, the UE is mandated to continue monitoring for Random Access Responses (Msg2) for the whole duration of the ra-ResponseWindow. According to the existing specification, this implies monitoring downlink control information (DCI) where the CRC parity bits are scrambled with the RA-RNTI.

In certain embodiments, the base unit 110 can send another Msg2 (with the above-mentioned constraint of keeping the transport block size the same) to schedule another Msg3 transmission opportunity, instead of using a PDCCH carrying DCI triggering a HARQ retransmission of Msg3, where the CRC parity bits of the DCI are scrambled with a Temporary Cell Radio Network Temporary Identifier (TC-RNTI) or scrambled with a Cell—Radio Network Temporary Identifier (C-RNTI).

In some embodiments, the additional random-access response message includes an additional redundancy version (RV) parameter to facilitate efficient HARQ combination of a plurality of contention request transmissions.

In various embodiments, the random-access response window that is started after receiving the random-access response message is longer than a release-defined random access response window length. As used herein, the term "release defined random-access response window length" refers to an RAR window size defined for current release of a 3GPP radio system standard. For example, in Release 15, the RAR window size is 10 ms and for Release 16, the RAR window size is expected to be extended to 20 ms.

In certain embodiments, the RAR window that is started after receiving the random-access response message is longer than a system frame length. In some embodiments, the system frame length is 10 ms. In various embodiments the processor 205 computes a random-access radio network temporary identifier based on a system frame number module low on integer multiple of the system frame length. In other words, to uniquely identify the multiple RACH occasions with the larger (>10 ms) ra-ResponseWindow length, the RA-RNTI computation may need to be updated and be based on the SFN (System Frame Number). In addition, the RA-RNTI may be based on an integer parameter 'x' representing the maximum allowed value of the (extended) Msg2 window (ra-ResponseWindow) (e.g., in multiple of 10 ms) which may be fixed in the specification (e.g., x=ceil(max Msg2 window length (in ms)/10), so x=2 for 20 ms maximum value of the Msg2 window) or in certain embodiments may be signaled via higher layers such as in the RACH configuration.

Referring now to the second embodiment which includes structures and functions which the processor 205 may use to modify the behavior of the random access response window which may also minimize RACH procedure delay associated with unmodified RACH behavior such as found in Release 15. In various embodiments, enhancing the RACH behavior includes monitoring for an additional random access response during the random access response window until a trigger ends the random access response window.

In some embodiments, the trigger includes the user equipment apparatus 200 successfully completing a clear channel assessment for transmitting a contention request. In other words, the user equipment apparatus 200 may stop monitoring for Random Access Responses (Msg2) as soon as Msg3 has been physically transmitted in response to Msg2 within the ra-ResponseWindow. In this regard, a transmission implies that CCA succeeded for Msg3. However, it may not necessarily imply that the base unit has received the transmission successfully. In this way, if Msg2 is received but CCA for Msg3 fails, the user equipment apparatus 200 still monitors for later Msg2 transmissions until the ra-ResponseWindow stops. The effect is similar to the first embodiment: the base unit 110 can send another Msg2 (with the mentioned constraint of the transport block size) to schedule another Msg3 opportunity, instead of using a PDCCH carrying DCI where the CRC is scrambled with C-RNTI/TC-RNTI triggering a HARQ retransmission of Msg3.

In certain embodiments, instead of or in addition to using the physical layer transmission of Msg3 as a stopping criterion i.e., trigger of the ra-ResponseWindow, the trigger includes receiving a layer two ("L2") acknowledgement by the user equipment apparatus 200. In further embodiments, the trigger includes receiving a PDCCH carrying downlink control information where the CRC is scrambled with a relevant radio network temporary identifier requesting a HARQ retransmission of a contention request. In various embodiments, the trigger includes reception of a contention resolution message. In certain embodiments, the additional random access response includes an additional redundancy version parameter to facilitate efficient HARQ combination of a plurality of contention request transmissions.

Referring now to the sixth embodiment which includes structures and functions which the processor 205 may use to modify conditions to start the ra-ContentionResolution timer to enhance RACH behavior e.g., to minimize RACH procedure delay, and/or to restart the ra-ContentionResolution timer.

As described above with respect to the sixth embodiment, in various embodiments, minimizing the RACH procedure delay relative to the HARQ retransmission procedure time includes starting a contention resolution timer in response to a physical layer entity of the remote unit indicating transmission of the contention request. In such embodiments, the physical layer entity of the remote unit, e.g., the user equipment apparatus 200, indicating transmission of the contention request includes completing a successful clear channel assessment i.e., LBT procedure for transmitting a contention request. In one embodiment, starting the contention resolution timer includes pausing, e.g., holding, the contention resolution timer in response to an unsuccessful clear channel assessment for a transmission opportunity for transmitting the contention request.

Thus, the structures and functions implemented by the processor 205 of the user equipment apparatus 200 improve the function of the NR-U system by individually and collectively minimizing RACH procedure delay related to various message failures relative to the HARQ retransmission procedure time that occurs in existing system in response to certain message failures.

Figure 3:
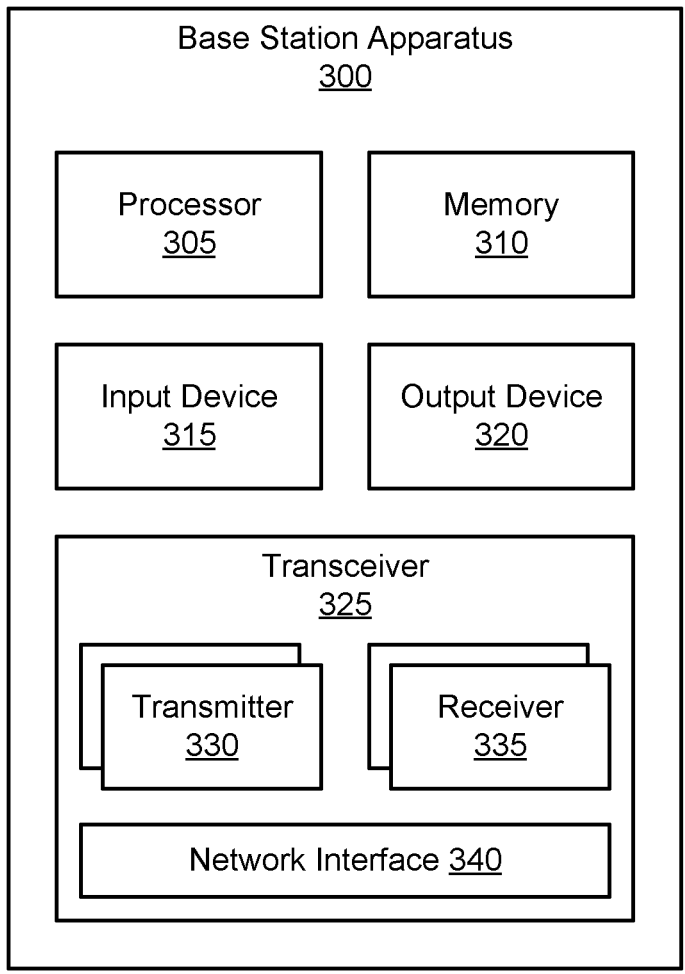
FIG. 3 is a schematic block diagram illustrating one embodiment of a base unit apparatus that may be used for efficient RACH behavior.

FIG. 3 depicts one embodiment of a base station apparatus 300 that may be used for efficient RACH behavior, such as for NR-U, according to embodiments of the disclosure. In various embodiments, the base station apparatus 300 includes structures and functions that are complementary to the structures and functions of the remote unit 105, the user equipment apparatus 200, and the UE 405, described above with respect to FIGS. 1, 2, and 4-7. For example, the base station apparatus 300 may transmit data which is received by the user equipment apparatus 200 and conversely, the user equipment apparatus 200 may transmit data which is received by the base station apparatus 300.

In various embodiments, the structures and functions of the base station apparatus 300 may be generally used to implement the first, second, third, fourth, fifth, sixth, seventh, eighth embodiments described above with respect to the user equipment apparatus 200 with the respective roles of the base station apparatus 300 and the user equipment apparatus 200 being generally complementary regarding transmitting and receiving data. For example, the processor 305 of the base station apparatus 300 may receive the first PRACH preamble which the processor 205 of the user equipment apparatus 200 controls the transmitter 230 to transmit, and vice versa.

The base station apparatus 300 may be one embodiment of the base unit 110 (also sometimes referred to as RAN node or gNB) described above. Furthermore, the base station apparatus 300 may include a processor 305, a memory 310, an input device 315, an output device 320, a transceiver 325 (which may include one or more transmitters 330 and one or more receivers 335), and a network interface 340. In some embodiments, the input device 315 and the output device 320 are combined into a single device, such as a touchscreen. In certain embodiments, the base station apparatus 300 may not include any input device 315 and/or output device 320. In some embodiments, the base station apparatus 300 may include one or more of the processor 305, the memory 310, the transceiver 325, the transmitter 330 the receiver 335, and the network interface 340, and without necessarily including the input device 315 and/or the output device 320.

The processor 305, in one embodiment, may include any known controller capable of executing computer-readable instructions and/or capable of performing logical operations. For example, the processor 305 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 305 executes instructions stored in the memory 310 to perform the methods and routines described herein. The processor 305 is communicatively coupled to the memory 310, the input device 315, the output device 320, and the transceiver 325.

In various embodiments, the processor 305 receives a first PRACH preamble from a remote unit 105 to start a RACH procedure. Moreover, the processor 305 may control the transmitter 330 to transmit a random access response during a random access response window. Further, the processor 305 enhances RACH behavior and in various embodiments, minimizes a delay for successfully completing the RACH procedure relative to delays which may occur in an unmodified RACH procedure, such as for example as specified in Release 15.

The memory 310, in one embodiment, is a computer readable storage medium. In some embodiments, the memory 310 includes volatile computer storage media. For example, the memory 310 may include a RAM, including dynamic RAM ("DRAM"), synchronous dynamic RAM ("SDRAM"), and/or static RAM ("SRAM"). In some embodiments, the memory 310 includes non-volatile computer storage media. For example, the memory 310 may include a hard disk drive, a flash memory, or any other suitable non-volatile computer storage device. In some embodiments, the memory 310 includes both volatile and non-volatile computer storage media.

In some embodiments, the memory 310 stores data related to modifying a radio capability. For example, the memory 310 may store parameters indicating RACH message transmission opportunities, backoff value scaling parameters, and the like. In certain embodiments, the memory 310 also stores program code and related data, such as an operating system or other controller algorithms operating on the remote unit 105.

The input device 315, in one embodiment, may include any known computer input device including a touch panel, a button, a keyboard, a stylus, a microphone, or the like. In some embodiments, the input device 315 may be integrated with the output device 320, for example, as a touchscreen or similar touch-sensitive display. In some embodiments, the input device 315 includes a touchscreen such that text may be input using a virtual keyboard displayed on the touch-screen and/or by handwriting on the touchscreen. In some embodiments, the input device 315 includes two or more different devices, such as a keyboard and a touch panel.

The output device 320, in one embodiment, is designed to output visual, audible, and/or haptic signals. In some embodiments, the output device 320 includes an electronically controllable display or display device capable of outputting visual data to a user. For example, the output device 320 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the output device 320 may include a wearable display separate from, but communicatively coupled to, the rest of the base station apparatus 300, such as a smart watch, smart glasses, a heads-up display, or the like. Further, the output device 320 may be a component of a smart phone, a personal digital assistant, a television, a table computer, a notebook (laptop) computer, a personal computer, a vehicle dashboard, or the like.

In certain embodiments, the output device 320 includes one or more speakers for producing sound. For example, the output device 320 may produce an audible alert or notification (e.g., a beep or chime). In some embodiments, the output device 320 includes one or more haptic devices for producing vibrations, motion, or other haptic feedback. In some embodiments, all or portions of the output device 320 may be integrated with the input device 315. For example, the input device 315 and output device 320 may form a touchscreen or similar touch-sensitive display. In other embodiments, the output device 320 may be located near the input device 315.

The transceiver 325 includes at least transmitter 330 and at least one receiver 335. One or more receivers 335 may be used to receive UL communication signals from a remote unit 105, such as the UL transmissions described herein. Similarly, one or more transmitters 330 may be used to provide DL communication signals to the remote unit 105, as described herein. Although only one transmitter 330 and one receiver 335 are illustrated, the base station apparatus 300 may have any suitable number of transmitters 330 and receivers 335. Further, the transmitter(s) 330 and the receiver(s) 335 may be any suitable type of transmitters and receivers. In one embodiment, the transceiver 325 includes a first transmitter/receiver pair used to communicate via the network interface 340 with a mobile communication network over licensed radio spectrum and a second transmitter/receiver pair used to communicate with a mobile communication network over unlicensed radio spectrum.

FIG. 4 depicts one embodiment of an interaction 400 including a RACH procedure 425 between a UE 405 and a RAN node 410 (also referred to, in certain embodiments, as base unit). The RAN node 410 broadcasts a system information block ("SIB") 415, which the UE 405 receives. The UE 405 uses information in the SIB 415 to configure itself for the RACH procedure 425. The UE 405 then sends a PRACH preamble 420 to start the RACH procedure 425, referred to as Msg1 of the RACH procedure 425. The RAN node 410 receives the PRACH preamble 420 and sends a Random Access Response ("RAR") 430, referred to as Msg2 of the RACH procedure 425. The UE listens for the RAR 430 over a Random Access Response window 435

(ra-ResponseWindow), as described above. In the RACH procedure 425, the UE 405 sends a contention request 440, referred to as Msg3 of the RACH procedure 425. One example of a Msg3 is an RRC Connection Request. The RAN node 410 sends a contention resolution message 445 to the UE 405, referred to as Msg4. Here, the Msg4 may include a C-RNTI for the UE 405.

In various embodiments, the interaction 400 may be efficient by minimizing a delay of the RACH procedure 425 related to a failure of a message between the UE 405 and RAN node 410. For example, the RAN node 410 may indicate that the UE 405 has multiple transmission opportunities to transmit Msg3. Some of the various ways in which the RACH behavior may be efficient and a delay of the RACH procedure 425 which may occur in systems using unmodified RACH procedures may be minimized are described below with respect to FIGS. 5-7 and 8.

Figure 5:
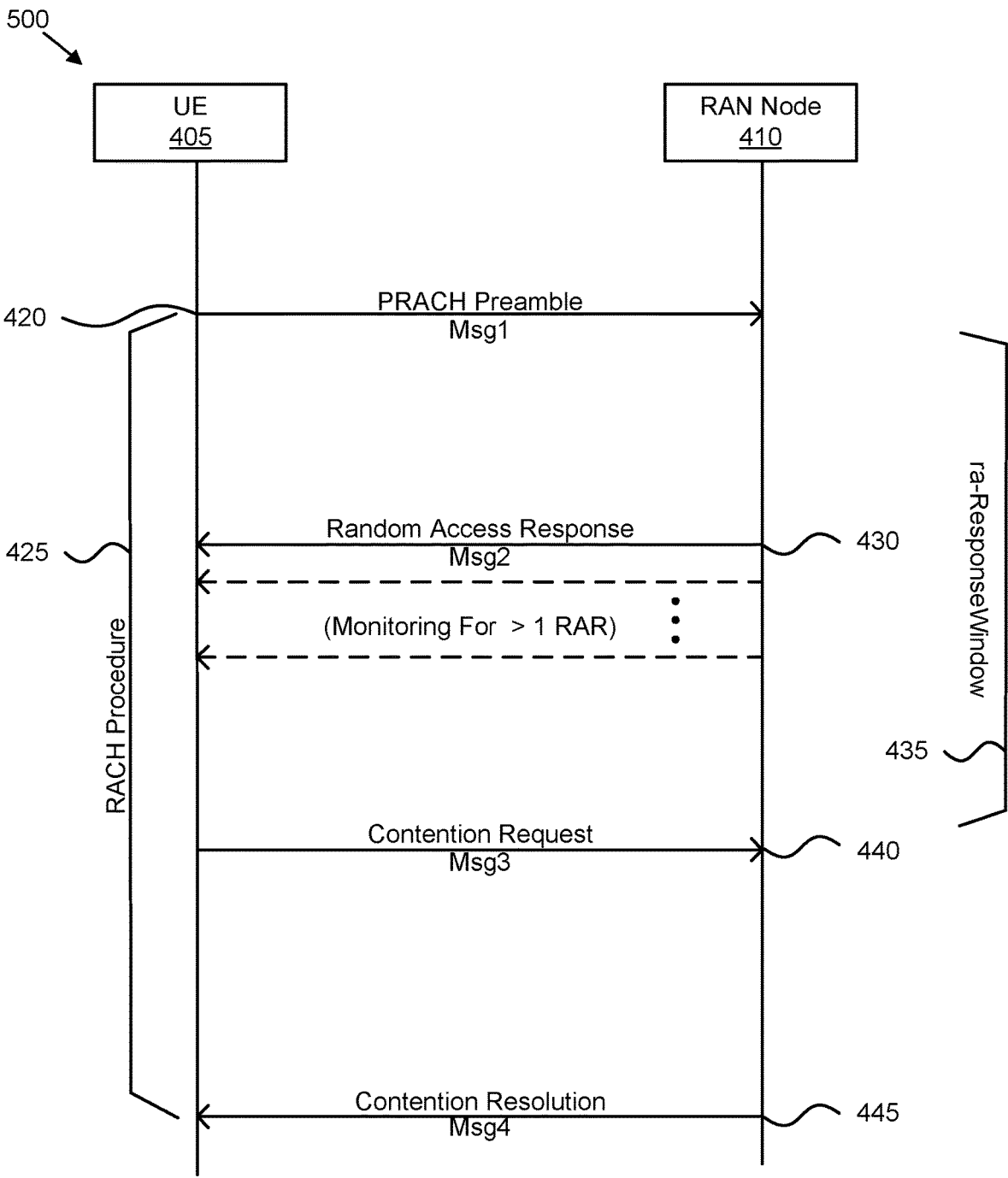
FIG. 5 is a block diagram illustrating one embodiment of an efficient RACH behavior.

FIG. 5 is a block diagram illustrating an embodiment of an interaction 500 illustrating one embodiment of an efficient RACH behavior, such as for NR-U. In one embodiment, the interaction 500 includes a RACH procedure 425 between the UE 405 and the RAN node 410, according to embodiments of the disclosure. In various embodiments, after receiving an initial RAR 430, the UE 405 continues to monitor, e.g., listen, for more than one RAR 430 during the Random Access Response window 435. In such embodiments, one distinction is that the RAN node 410 may send multiple RAR 430 to the UE 405, as described above. While the RAR 430 is depicted as occurring during the first transmission opportunity, in other embodiments the channel may be unavailable during the first transmission opportunity, requiring the RAN Node 410 to transmit the RAR 430 during a subsequent transmission opportunity.

Figure 6:
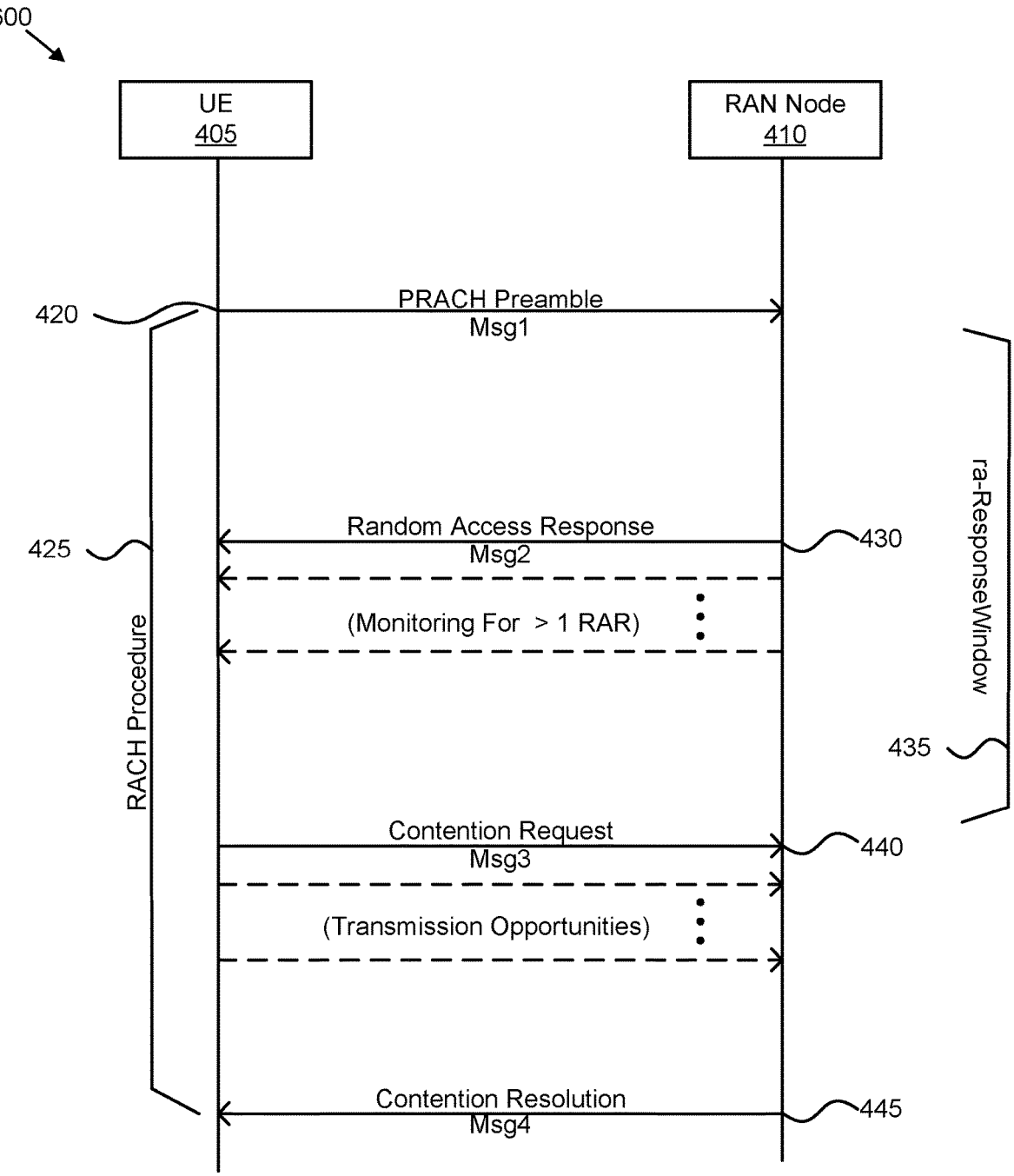
FIG. 6 is a block diagram illustrating another embodiment of an efficient RACH behavior.

FIG. 6 is a block diagram illustrating another embodiment of an interaction 600 in which a RACH behavior is efficient e.g., for NR-U. In one embodiment, the interaction 600 includes a RACH procedure 425 between the UE 405 and the RAN node 410 according to embodiments of the disclosure. In certain embodiments, the UE 405 starts the RACH procedure 425 by sending the PRACH preamble 420 which the RAN node 410 receives. In response to receiving the PRACH preamble, the RAN node 410 sends RAR 430 to the UE 405. As described above, in certain embodiments, the UE 405 may continue monitoring for more than one Msg2, even after the RAR reception is considered successful. This continued monitoring by the UE 405 for more than one Msg2 increases the probability that the UE 405 receives a valid PDCCH with CRC scrambled by RA-RNTI and the RAR containing the random access preamble identifier that matches the transmitted PRACH preamble index.

In various embodiments, as described above with respect to FIG. 2, the UE 405 obtains, e.g., is provided with or receives one or more parameters indicating, multiple Msg3 transmission opportunities. In some embodiments, the UE 405 receives one or more parameters indicating multiple Msg3 transmission opportunities and/or multiple Msg3 transmissions where the number of transmission opportunities and/or Msg3 transmissions is conveyed in Msg2. In certain embodiments, the UE 405 receives one or more parameters indicating multiple Msg3 transmission opportunities and/or multiple Msg3 transmissions where a parameter indicating the number of transmission opportunities and/or Msg3 transmissions is conveyed in DCI carrying DL assignment information for the reception of Msg2.

Figure 7:
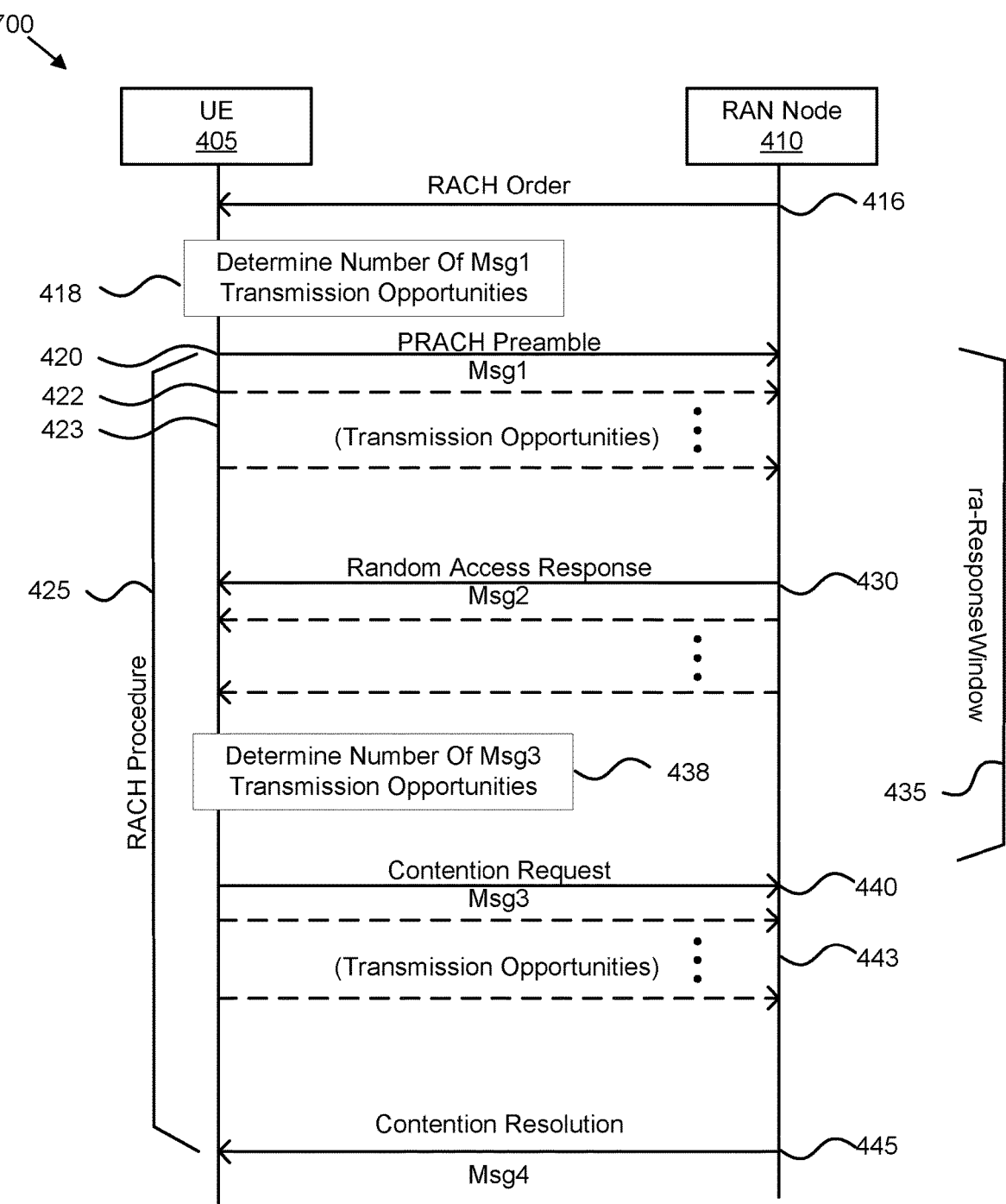
FIG. 7 is a block diagram illustrating a further embodiment of an efficient RACH behavior.

FIG. 7 is a block diagram illustrating a further embodiment of an interaction 700 in which a RACH behavior is efficient, such as for NR-U. In one embodiment, the RAN node 410 sends a RACH order 416 which includes a number of Msg1 transmission opportunities 423. The UE 405 receives the RACH order 416 and determines 418 the number of Msg1 transmission opportunities 423 which have been obtained. The UE 405 transmits the first PRACH preamble 420 to start the RACH procedure 425. In some embodiments, the UE 405 transmits the first PRACH preamble 420 in a first available opportunity of the number of transmission opportunities 423 obtained. In various embodiments, in response to receiving the PRACH preamble 420, the RAN node 410 transmits a RAR 430 which the UE 405 receives. The UE 405 then determines 438 the number of Msg3 transmission opportunities it has obtained via the RAR 430.

In various embodiments, the UE 405 transmits a contention request 440 (also referred to as Msg3) to the RAN node 410 in one of the received number of Msg3 transmission opportunities such as for example, at the earliest opportunity. In certain embodiments, the UE 405 transmits a second PRACH preamble 422 in response to being unable to transmit a RACH Msg3 within an indicated RACH Msg3 transmission opportunity 443.

In response to receiving the contention request 440, the RAN node 410 transmits a contention resolution message 445 also referred to as Msg4 to the UE 405 and the RACH procedure 425 ends. In various embodiments, the number of Msg1 transmission opportunities 423 and/or Msg3 transmission opportunities 443 are obtained via broadcast system information, higher layer signaling, and/or by a predefined specification as described above. In certain embodiments, the behavior of the random access response window 435 is efficient and may minimize RACH procedure delay relative to delays that may occur in existing systems, such as for example, as in the RACH procedure specified in Release 15.

Figure 8:
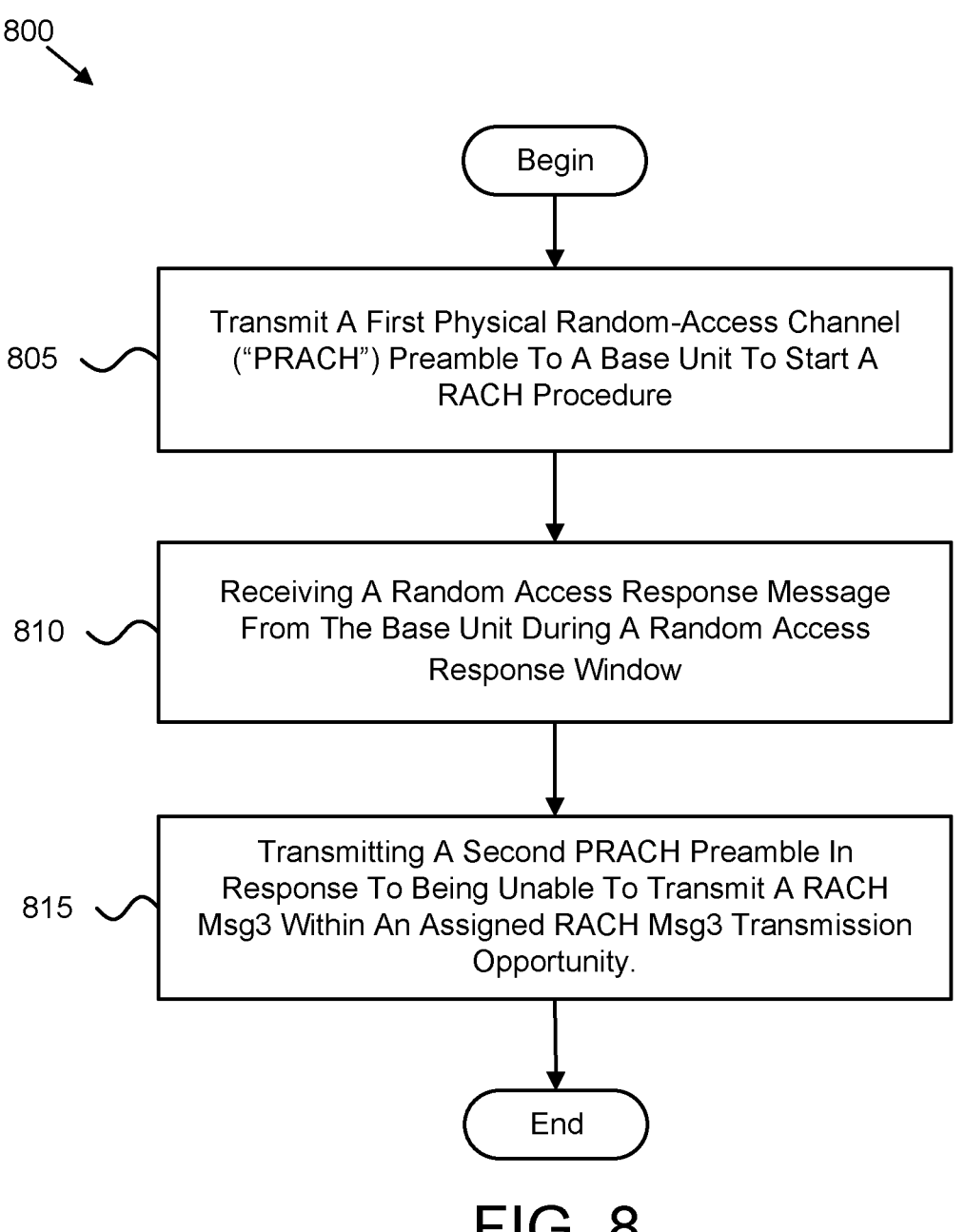
FIG. 8 is a schematic block diagram illustrating one embodiment of a method for performing a RACH procedure with an efficient RACH behavior.

FIG. 8 is a schematic block diagram illustrating one embodiment of a method 800 for providing efficient RACH behavior e.g., for NR-U. In one embodiment, the method 800 begins and transmits 805 a first physical random-access channel ("PRACH") preamble to a base unit to start a RACH procedure, receives 810 a random access response from the base unit during a random access response window, and transmits 815 a second PRACH preamble in response to being unable to transmit a RACH Msg3 within an indicated RACH Msg3 transmission opportunity. In various embodiments, the user equipment apparatus 200 and/or the UE 405 perform one or more of the steps of the method 800.

An apparatus for a remote unit includes, in one embodiment, a transmitter that transmits a first physical random-access channel ("PRACH") preamble to a base unit to start a RACH procedure; a receiver that receives a random access response from the base unit within a random access response window; and a processor that controls the transmitter to transmit a second PRACH preamble in response to being unable to transmit a RACH Msg3 within an indicated RACH Msg3 transmission opportunity. In one embodiment, the RACH Msg3 includes a contention request. In various embodiments, the second PRACH preamble is selected from the same preamble group as the first PRACH preamble. In certain embodiments, the processor considers a contention resolution timer to be expired in response to being unable to transmit the RACH Msg3 within the indicated RACH Msg3 transmission opportunity.

In one embodiment, being unable to transmit the RACH Msg3 within the indicated RACH Msg3 transmission opportunity includes failing to successfully perform a clear channel assessment for the RACH Msg3. In some embodiments, the processor considers the RACH procedure as continuing in response to being unable to transmit the RACH Msg3 within an indicated RACH Msg3 transmission opportunity. In various embodiments, the processor obtains a plurality of RACH Msg3 transmission opportunities comprising the indicated RACH Msg3 transmission opportunity. In certain embodiments, the processor obtains the plurality of RACH Msg3 transmission opportunities as communicated in the random access response. In one embodiment, the processor obtains the plurality of RACH Msg3 transmission opportunities as communicated in a DCI carrying downlink assignment information for transmission of the random access response.

In various embodiments, the processor controls the transmitter to transmit more than one RACH Msg3 in the plurality of RACH Msg3 transmission opportunities. In certain embodiments, processor receives a DCI indicating a PRACH preamble to be used in the RACH procedure ("RACH Order") and a parameter indicating a predetermined number of RACH Msg3 transmission opportunities. In some embodiments, the predetermined number of RACH Msg3 transmission opportunities are distributed according to a time slot pattern received in the RACH Order. In one embodiment, the processor receives a DCI indicating a PRACH preamble to be used in the RACH procedure ("RACH Order") and a parameter indicating a predetermined number of RACH Msg1 transmission opportunities.

In certain embodiments, the predetermined number of RACH Msg1 transmission opportunities are distributed according to a time slot pattern received in the RACH Order. In various embodiments, the processor controls the transmitter to transmit the first PRACH preamble at an earliest opportunity of the RACH Msg1 transmission opportunities in response to performing a successful clear channel assessment. In one embodiment, the apparatus further includes transmitting the first PRACH preamble in any of the predetermined number of RACH Msg1 transmission opportunities for which a successful clear channel assessment is performed.

In various embodiments, the processor receives a DCI indicating a PRACH preamble to be used in the RACH procedure ("RACH Order") and a parameter indicating a predetermined number of RACH Msg1 transmission opportunities. In one embodiment, the processor monitors for more than one random access response transmitted within the random access response window. In certain embodiments, the processor stops monitoring for the more than one random access response in response to a trigger. In one embodiment, the trigger includes successfully completing a clear channel assessment for transmitting a contention request in various embodiments, the trigger includes receiving a layer two acknowledgement.

In some embodiments, the trigger includes receiving a PDCCH carrying downlink control information where cyclic redundancy check ("CRC") parity bits are scrambled with a relevant radio network temporary identifier requesting a HARQ retransmission of a contention request. In certain embodiments, the trigger includes reception of a contention resolution message. In some embodiments, the processor controls the transmitter to transmit a contention request during the random access response window, the contention request being sent in response to receiving the random access response. In certain embodiments, the more than one random access response indicates the same contention request transport block size as the random access response. In various embodiments, the more than one random access response includes an additional redundancy version parameter to facilitate efficient HARQ combination of a plurality of contention request transmissions. In one embodiment, the random access response window that is started after receiving the random access response is longer than a release-defined random access response window length.

In various embodiments, the random access response window that is started after receiving the random access response is longer than a system frame length. In some embodiments, the system frame length is 10 ms. In certain embodiments, the processor computes a random access radio network temporary identifier based on a system frame number modulo an integer multiple of the system frame length. In one embodiment, a MAC entity of the remote unit considers the RACH procedure as ongoing in response to not being able to transmit the RACH Msg3 within an indicated RACH Msg3 transmission opportunity for transmitting the RACH Msg3. In some embodiments, the processor controls the transmitter to transmit the second PRACH preamble using a reduced backoff value in response to being unable to transmit the RACH Msg3 within the indicated RACH Msg3 transmission opportunity. In various embodiments, the reduced backoff value overrides a backoff value indicated in the random access response. In some embodiments, the reduced backoff value is obtained by applying a scaling factor to the backoff value indicated in the random access response.

In certain embodiments, the scaling factor applied to the backoff values is a scaling parameter for a backoff indicator for prioritizing transmission of the first PRACH preamble. In various embodiments, the processor continues monitoring for a Physical Downlink Control Channel ("PDCCH") requesting retransmission of the RACH Msg3, the PDCCH addressed to an identifier selected from a Cell Radio Network Temporary Identifier ("C-RNTI") and a Temporary Cell Radio Network Temporary Identifier ("TC-RNTI"). In some embodiments, in response to not being able to transmit the RACH Msg3 is the indicated RACH Msg3 transmission opportunity, the processor further continues monitoring for a Physical Downlink Control Channel ("PDCCH") requesting retransmission of the RACH Msg3, the PDCCH addressed to an identifier selected from a Cell Radio Network Temporary Identifier ("C-RNTI") and a Temporary Cell Radio Network Temporary Identifier ("TC-RNTI") while performing a transmission of the second PRACH preamble.

In one embodiment, in response to receiving a PDCCH requesting retransmission of the RACH Msg3, the processor stops further transmissions of the second PRACH preamble and stops monitoring for a corresponding random access request. In some embodiments, in response to performing a successful clear channel assessment for the RACH Msg3, the processor starts a contention resolution timer. In certain embodiments, starting the contention resolution timer includes pausing the contention resolution timer in response to an unsuccessful clear channel assessment for a transmission opportunity for transmitting the RACH Msg3. In some embodiments, in response to successfully receiving a random access response for the second PRACH preamble, the processor stops a contention resolution timer and controls the transmitter to transmit the RACH Msg3 according to the received random access response.

A method includes, in one embodiment, transmitting a first physical random-access channel ("PRACH") preamble to a base unit to start a RACH procedure; receiving a random access response from the base unit during a random access response window; and transmitting a second PRACH preamble in response to being unable to transmit a RACH Msg3 within an indicated RACH Msg3 transmission opportunity. In various embodiments, the RACH Msg3 includes a contention request. In some embodiments, the second PRACH preamble is selected from the same preamble group as the first PRACH preamble. In certain embodiments, the method considers a contention resolution timer to be expired in response to being unable to transmit the RACH Msg3 within the indicated RACH Msg3 transmission opportunity. A one embodiment, being unable to transmit the RACH Msg3 within the indicated RACH Msg3 transmission opportunity includes failing to successfully perform a clear channel assessment for the RACH Msg3.

In various embodiments, the method considers the RACH procedure as continuing in response to being unable to transmit the RACH Msg3 within the indicated RACH Msg3 transmission opportunity. In some embodiments, the method obtains a plurality of RACH Msg3 transmission opportunities comprising the indicated RACH Msg3 transmission opportunity. In one embodiment, the method obtains the plurality of RACH Msg3 transmission opportunities as communicated in the random access response. In certain embodiments, the method obtains the plurality of RACH Msg3 transmission opportunities as communicated in a DCI carrying downlink assignment information for transmission of the random access response. In various embodiments, the method transmits more than one RACH Msg3 in the plurality of RACH Msg3 transmission opportunities. In certain embodiments, the method receives a DCI indicating a PRACH preamble to be used in the RACH procedure ("RACH Order") and a parameter indicating a predetermined number of RACH Msg3 transmission opportunities.

In one embodiment, the predetermined number of RACH Msg3 transmission opportunities are distributed according to a time slot pattern received in the RACH Order. In various embodiments, the method receives a DCI indicating a PRACH preamble to be used in the RACH procedure ("RACH Order") and a parameter indicating a predetermined number of RACH Msg1 transmission opportunities. In certain embodiments, the predetermined number of RACH Msg1 transmission opportunities are distributed according to a time slot pattern received in the RACH Order. In one embodiment, the method transmits the first PRACH preamble at an earliest opportunity of the RACH Msg1 transmission opportunities in response to performing a successful clear channel assessment.

In certain embodiments, the method further includes transmitting the first PRACH preamble in any of the predetermined number of RACH Msg1 transmission opportunities for which a successful clear channel assessment is performed. In one embodiment, the method receives a DCI indicating a PRACH preamble to be used in the RACH procedure ("RACH Order") and a parameter indicating a predetermined number of RACH Msg1 transmission opportunities. In various embodiments, the method monitors for more than one random access response transmitted within the random access response window. In some embodiments, the method stops monitoring for the more than one random access response in response to a trigger. In various embodiments, the trigger includes successfully completing a clear channel assessment for transmitting a contention request.

In some embodiments, the trigger includes receiving a layer two acknowledgement. In various embodiments, the trigger includes receiving a PDCCH carrying downlink control information where cyclic redundancy check ("CRC") parity bits are scrambled with a relevant radio network temporary identifier requesting a HARQ retransmission of a contention request. In certain embodiments, the trigger includes reception of a contention resolution message. In some embodiments, the method transmits a contention request during the random access response window, the contention request being sent in response to receiving the random access response. In one embodiment, the more than one random access response indicates the same contention request transport block size as the random access response. In various embodiments, the more than one random access response includes an additional redundancy version parameter to facilitate efficient HARQ combination of a plurality of contention request transmissions.

In certain embodiments, the random access response window that is started after receiving the random access response is longer than a release-defined random access response window length. In various embodiments, the random access response window that is started after receiving the random access response is longer than a system frame length. In some embodiments, the system frame length is 10 ms. In certain embodiments, the method computes a random access radio network temporary identifier based on a system frame number modulo an integer multiple of the system frame length.

In various embodiments, a MAC entity of the remote unit considers the RACH procedure as ongoing in response to not being able to transmit the RACH Msg3 within the indicated RACH Msg3 transmission opportunity for transmitting the RACH Msg3. In some embodiments, the method transmits the second PRACH preamble using a reduced backoff value in response to being unable to transmit the RACH Msg3 within the indicated RACH Msg3 transmission opportunity. In some embodiments, the reduced backoff value overrides a backoff value indicated in the random access response.

In various embodiments, the reduced backoff value is obtained by applying a scaling factor to the backoff value indicated in the random access response. In certain embodiments, the scaling factor applied to the backoff values is a scaling parameter for a backoff indicator for prioritizing transmission of the first PRACH preamble. In some embodiments, the method continues monitoring for a Physical Downlink Control Channel ("PDCCH") requesting retransmission of the RACH Msg3, the PDCCH addressed to an identifier selected from a Cell Radio Network Temporary Identifier ("C-RNTI") and a Temporary Cell Radio Network Temporary Identifier ("TC-RNTI").

In certain embodiments, in response to not being able to transmit the RACH Msg3 is the indicated RACH Msg3 transmission opportunity, the method continues monitoring for a Physical Downlink Control Channel ("PDCCH") requesting retransmission of the RACH Msg3, the PDCCH addressed to an identifier selected from a Cell Radio Network Temporary Identifier ("C-RNTI") and a Temporary Cell Radio Network Temporary Identifier ("TC-RNTI") while performing a transmission of the second PRACH preamble. In some embodiments, in response to receiving a PDCCH requesting retransmission of the RACH Msg3, the method stops further transmissions of the second PRACH preamble and stops monitoring for a corresponding random access request.

In certain embodiments, in response to performing a successful clear channel assessment for the RACH Msg3, the method starts a contention resolution timer. In some embodiments, starting the contention resolution timer includes pausing the contention resolution timer in response to an unsuccessful clear channel assessment for a transmission opportunity for transmitting the RACH Msg3. In certain embodiment, where in response to successfully receiving a random access response for the second PRACH preamble, the method stops a contention resolution timer and transmits the RACH Msg3 according to the received random access response.

Disclosed herein is a first apparatus for performing an efficient RACH procedure, according to embodiments of the disclosure. The first apparatus may be implemented by a communication device, such as the remote unit 105, the user equipment apparatus 200, and/or the UE 405, described above. The first apparatus includes at least one processor coupled with at least one memory and configured to cause the UE to: A) transmit a first physical random-access channel ("PRACH") preamble to trigger a RACH procedure; B) receive a random access response ("RAR") message within a random access response window; C) initiate a contention resolution timer in response to a Medium Access Control ("MAC") layer delivering a MAC Protocol Data Unit ("PDU") to a physical ("PHY") layer, the MAC PDU including a RACH message 3 ("Msg3"); D) determine that the PHY layer is unable to transmit the RACH Msg3 within a RACH Msg3 transmission opportunity indicated by the RAR message due to a result of a clear channel assessment; E) transmit a second PRACH preamble prior to expiry of the contention resolution timer and in response to the PHY layer being unable to transmit the RACH Msg3 within the RACH Msg3 transmission opportunity indicated by the RAR message; F) stop transmission of the second PRACH preamble in response to receiving a request to retransmit the RACH Msg3; and G) stop the contention resolution timer in response to receiving a second RAR message, where the second RAR message is a response to the second PRACH preamble.

In some embodiments, the RACH Msg3 comprises a contention request. In some embodiments, the second PRACH preamble is selected from the same preamble group as the first PRACH preamble, the second PRACH preamble being a different preamble than the first PRACH preamble.

In some embodiments, the at least one processor is configured to cause the UE to consider the contention resolution timer to be expired in response to being unable to transmit the RACH Msg3 within the indicated RACH Msg3 transmission opportunity. In some embodiments, the at least one processor is configured to cause the UE to consider the RACH procedure as continuing in response to being unable to transmit the RACH Msg3 within the indicated RACH Msg3 transmission opportunity.

In some embodiments, the at least one processor is configured to cause the UE to obtain a plurality of RACH Msg3 transmission opportunities comprising the indicated RACH Msg3 transmission opportunity. In certain embodiments, the at least one processor is configured to cause the UE to obtain the plurality of RACH Msg3 transmission opportunities as communicated in the random access response.

In certain embodiments, the at least one processor is configured to cause the UE to obtain the plurality of RACH Msg3 transmission opportunities as communicated in a DCI carrying downlink assignment information for transmission of the random access response. In certain embodiments, the at least one processor is configured to cause the UE to transmit more than one RACH Msg3 in the plurality of RACH Msg3 transmission opportunities.

In some embodiments, the at least one processor is configured to cause the UE to receive a DCI indicating a PRACH preamble to be used in the RACH procedure and to receive a parameter indicating a predetermined number of RACH Msg3 transmission opportunities. In some embodiments, the at least one processor is configured to cause the UE to receive a DCI indicating a PRACH preamble to be used in the RACH procedure and to receive a parameter indicating a predetermined number of RACH Msg1 transmission opportunities.

In some embodiments, the at least one processor is configured to cause the UE to monitor for more than one random access response transmitted within the random access response window. In certain embodiments, the at least one processor is configured to cause the UE to stop monitoring for the more than one random access response in response to the result of the clear channel assessment being successful for transmitting the RACH Msg3.

In some embodiments, the at least one processor is configured to cause a MAC entity of the UE to consider the RACH procedure as ongoing in response to not being able to transmit the RACH Msg3 within the indicated RACH Msg3 transmission opportunity for transmitting the RACH Msg3. In some embodiments, the at least one processor is configured to cause the UE to transmit the second PRACH preamble using a reduced backoff value in response to being unable to transmit the RACH Msg3 within the indicated RACH Msg3 transmission opportunity.

In certain embodiments, the reduced backoff value overrides a backoff value indicated in the random access response. In such embodiments, the reduced backoff value may be obtained by applying a scaling factor to the backoff value indicated in the random access response. In a further embodiment, the scaling factor applied to the backoff values is a scaling parameter for a backoff indicator for prioritizing transmission of the first PRACH preamble.

In some embodiments, the at least one processor is configured to cause the UE to continue monitoring for a Physical Downlink Control Channel ("PDCCH") requesting retransmission of the RACH Msg3, the PDCCH addressed to an identifier selected from a Cell Radio Network Temporary Identifier ("C-RNTI") and a Temporary Cell Radio Network Temporary Identifier ("TC-RNTI").

In some embodiments, in response to not being able to transmit the RACH Msg3 in the indicated RACH Msg3 transmission opportunity, the at least one processor is configured to cause the UE to continue monitoring for a Physical Downlink Control Channel ("PDCCH") requesting retransmission of the RACH Msg3, the PDCCH addressed to an identifier selected from a Cell Radio Network Temporary Identifier ("C-RNTI") and a Temporary Cell Radio Network Temporary Identifier ("TC-RNTI") while performing a transmission of the second PRACH preamble.

In certain embodiments, in response to receiving a PDCCH requesting retransmission of the RACH Msg3, the at least one processor is configured to cause the UE to stop further transmissions of the second PRACH preamble and to stop monitoring for a corresponding random access request. In some embodiments, in response to successfully receiving a random access response for the second PRACH preamble, the at least one processor is configured to cause the UE to stop a second contention resolution timer and to transmit the RACH Msg3 according to the received random access response.

Disclosed herein is a first method for performing an efficient RACH procedure, according to embodiments of the disclosure. The first method may be performed by a communication device, such as the remote unit 105, user equipment apparatus 200, and/or the UE 405, described above. The first method includes transmitting a first PRACH preamble to trigger a RACH procedure and receiving a RAR message during a random access response window. The first method includes initiating a contention resolution timer in response to a MAC layer delivering a MAC PDU to a PHY layer, the MAC PDU including a RACH Msg3 and determining that the PHY layer is unable to transmit the RACH Msg3 within a RACH Msg3 transmission opportunity indicated by the RAR message due to a result of a clear channel assessment. The first method includes transmitting a second PRACH preamble prior to expiry of the contention resolution timer and in response to the PHY layer being unable to transmit the RACH Msg3 within the RACH Msg3 transmission opportunity indicated by the received RAR message. The first method includes stopping transmission of the second PRACH preamble in response to receiving a request to retransmit the RACH Msg3 and stopping the contention resolution timer in response to receiving a second RAR message, where the second RAR message is a response to the second PRACH preamble.

In some embodiments, the RACH Msg3 comprises a contention request. In some embodiments, the second PRACH preamble is selected from the same preamble group as the first PRACH preamble, the second PRACH preamble being a different preamble than the first PRACH preamble.

In some embodiments, the first method includes considering the contention resolution timer to be expired in response to being unable to transmit the RACH Msg3 within the indicated RACH Msg3 transmission opportunity. In some embodiments, the first method includes considering the RACH procedure as continuing in response to being unable to transmit the RACH Msg3 within the indicated RACH Msg3 transmission opportunity.

In some embodiments, the first method includes obtaining a plurality of RACH Msg3 transmission opportunities comprising the indicated RACH Msg3 transmission opportunity. In certain embodiments, the first method includes obtaining the plurality of RACH Msg3 transmission opportunities as communicated in the random access response.

In certain embodiments, the first method includes obtaining the plurality of RACH Msg3 transmission opportunities as communicated in a DCI carrying downlink assignment information for transmission of the random access response. In certain embodiments, the first method includes transmitting more than one RACH Msg3 in the plurality of RACH Msg3 transmission opportunities.

In some embodiments, the first method includes receiving a DCI indicating a PRACH preamble to be used in the RACH procedure and to receive a parameter indicating a predetermined number of RACH Msg3 transmission opportunities. In some embodiments, the first method includes receiving a DCI indicating a PRACH preamble to be used in the RACH procedure and to receive a parameter indicating a predetermined number of RACH Msg1 transmission opportunities.

In some embodiments, the first method includes monitoring for more than one random access response transmitted within the random access response window. In certain embodiments, the first method includes stopping the monitoring for the more than one random access response in response to the result of the clear channel assessment being successful for transmitting the RACH Msg3.

In some embodiments, the at least one processor is configured to cause a MAC entity of the UE to consider the RACH procedure as ongoing in response to not being able to transmit the RACH Msg3 within the indicated RACH Msg3 transmission opportunity for transmitting the RACH Msg3. In some embodiments, the first method includes transmitting the second PRACH preamble using a reduced backoff value in response to being unable to transmit the RACH Msg3 within the indicated RACH Msg3 transmission opportunity.

In certain embodiments, the reduced backoff value overrides a backoff value indicated in the random access response. In such embodiments, the reduced backoff value may be obtained by applying a scaling factor to the backoff value indicated in the random access response. In a further embodiment, the scaling factor applied to the backoff values is a scaling parameter for a backoff indicator for prioritizing transmission of the first PRACH preamble.

In some embodiments, the first method includes continuing to monitor for a Physical Downlink Control Channel ("PDCCH") requesting retransmission of the RACH Msg3, the PDCCH addressed to an identifier selected from a Cell Radio Network Temporary Identifier ("C-RNTI") and a Temporary Cell Radio Network Temporary Identifier ("TC-RNTI").

In some embodiments, in response to not being able to transmit the RACH Msg3 in the indicated RACH Msg3 transmission opportunity, the first method includes continuing to monitor for a Physical Downlink Control Channel ("PDCCH") requesting retransmission of the RACH Msg3, the PDCCH addressed to an identifier selected from a Cell Radio Network Temporary Identifier ("C-RNTI") and a Temporary Cell Radio Network Temporary Identifier ("TC-RNTI") while performing a transmission of the second PRACH preamble.

In certain embodiments, in response to receiving a PDCCH requesting retransmission of the RACH Msg3, the first method includes stopping further transmissions of the second PRACH preamble and to stop monitoring for a corresponding random access request. In some embodiments, in response to successfully receiving a random access response for the second PRACH preamble, the first method includes stopping a second contention resolution timer and to transmit the RACH Msg3 according to the received random access response.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A user equipment (UE) for wireless communication, comprising:
at least one memory; and
at least one processor coupled with the memory and configured to cause the UE to:
transmit a first physical random-access channel (PRACH) preamble during a random access (RACH) procedure;
receive a random access response message during a random access response window;
determine a plurality of transmission opportunities for transmitting a RACH message 3 (Msg3) during the random access response window based on the random access response message, wherein the random access response message indicates a quantity of transmission opportunities in which the UE is allowed to transmit the RACH Msg3 and a number of copies of the RACH Msg3 the UE is to transmit;
perform a clear channel assessment (CCA) prior to each of the plurality of transmission opportunities;
transmit multiple copies of the RACH Msg3 based on the number of copies of the RACH Msg3 indicated by the random access response message using at least an earliest available transmission opportunity of the plurality of transmission opportunities based on the CCA; and
terminate the RACH Msg3 transmission before the indicated number of copies of the RACH Msg3 are transmitted in response to receiving a RACH message 4 (Msg4) or an acknowledgement for RACH Msg3.

2. The UE of claim 1, wherein the at least one processor is configured to cause the UE to transmit the RACH Msg3 in at least two of the plurality of transmission opportunities based on the CCA.

3. The UE of claim 1, wherein the plurality of transmission opportunities corresponds to a predetermined number of RACH Msg3 transmissions, and wherein the random access response message indicates the predetermined number.

4. The UE of claim 1, wherein the plurality of transmission opportunities corresponds to a predetermined number of RACH Msg3 transmissions, and wherein broadcast system information indicates the predetermined number.

5. The UE of claim 1, wherein the plurality of transmission opportunities comprises two or more consecutive slots.

6. The UE of claim 1, wherein the plurality of transmission opportunities are distributed according to a slot pattern indicated in the random access response message.

7. The UE of claim 1, wherein the at least one processor is configured to cause the UE to restart the RACH procedure in response to being unable to transmit the RACH Msg3 during the plurality of transmission opportunities.

8. The UE of claim 1, wherein the at least one processor is configured to cause the UE to apply a same RACH Msg3 physical uplink shared channel (PUSCH) time and frequency allocation for the plurality of transmission opportunities.

9. The UE of claim 1, wherein the plurality of transmission opportunities corresponds to a predetermined number of RACH Msg3 transmissions, and wherein the at least one processor is configured to cause the UE to receive downlink control information (DCI) indicating the predetermined number.

10. A method performed by a user equipment (UE), the method comprising:
transmitting a first physical random-access channel (PRACH) preamble during a random access (RACH) procedure;
receiving a random access response message during a random access response window;
determining a plurality of transmission opportunities for transmitting a RACH message 3 (Msg3) during the random access response window based on the random access response message, wherein the random access response message indicates a quantity of transmission opportunities in which the UE is allowed to transmit the RACH Msg3 and a number of copies of the RACH Msg3 the UE is to transmit;
performing a clear channel assessment (CCA) prior to each of the plurality of transmission opportunities;
transmitting multiple copies of the RACH Msg3 based on the number of copies of the RACH Msg3 indicated by the random access response message using at least an earliest available transmission opportunity of the plurality of transmission opportunities based on the CCA; and
terminating the RACH Msg3 transmission before the indicated number of copies of the RACH Msg3 are transmitted in response to receiving a RACH message 4 (Msg4) or an acknowledgement for RACH Msg3.

11. The method of claim 10, further comprising transmitting copies of the RACH Msg3 in at least two of the plurality of transmission opportunities based on the CCA.

12. A base station for wireless communication, comprising:

at least one memory; and at least one processor coupled with the at least one memory and configured to cause the base station to:

receive, from a user equipment (UE), a first physical random-access channel (PRACH) preamble during a random access (RACH) procedure;

transmit a random access response message during a random access response window, wherein the random access response message indicates a quantity of transmission opportunities in which the UE is allowed to transmit the RACH message 3 (Msg3) and a number of copies of the RACH Msg3 the UE is to transmit;

allocate a plurality of transmission opportunities for transmission of the RACH Msg3 during the random access response window;

receive one or more copies of the RACH Msg3 during at least one of the plurality of transmission opportunities; and transmit a RACH message 4 (Msg4) or an acknowledgement for RACH Msg3 in response to receiving the one or more copies of the RACH Msg3 and before receiving the indicated number of copies of the RACH Msg3, wherein the RACH Msg4 or the acknowledgement for RACH Msg3 indicates to terminate a transmission of additional copies of the RACH Msg3.

13. The base station of claim 12, wherein the at least one processor is configured to cause the base station to receive the RACH Msg3 in at least two of the plurality of transmission opportunities.

14. The base station of claim 12, wherein the plurality of transmission opportunities comprises two or more consecutive slots.

15. The base station of claim 12, wherein the plurality of transmission opportunities are distributed according to a slot pattern indicated in the random access response message.

16. The base station of claim 12, wherein the at least one processor is configured to cause the base station to allocate a same RACH Msg3 physical uplink shared channel (PUSCH) time and frequency allocation for the plurality of transmission opportunities.

17. A method performed by a base station, the method comprising:

receiving, from a user equipment (UE), a first physical random-access channel (PRACH) preamble during a random access (RACH) procedure;

transmitting a random access response message during a random access response window, wherein the random access response message indicates a quantity of transmission opportunities in which the UE is allowed to transmit the RACH message 3 (Msg3) and a number of copies of the RACH Msg3 the UE is to transmit;

indicating a plurality of transmission opportunities for transmission of the RACH Msg3 during the random access response window;

receiving one or more copies of the RACH Msg3 during at least one of the plurality of transmission opportunities; and transmitting a RACH message 4 (Msg4) or an acknowledgement for RACH Msg3 in response to receiving the one or more copies of the RACH Msg3 and before receiving the indicated number of copies of the RACH Msg3, wherein the RACH Msg4 or the acknowledgement for RACH Msg3 indicates to terminate a transmission of additional copies of the RACH Msg3.

18. The method of claim 17, wherein the plurality of transmission opportunities comprises two or more consecutive slots.

19. The method of claim 17, wherein the plurality of transmission opportunities are distributed according to a slot pattern indicated in the random access response message.

20. The method of claim 17, further comprising allocating a same RACH Msg3 physical uplink shared channel (PUSCH) time and frequency allocation for the plurality of transmission opportunities.

* * * * *